US006761387B2

(12) United States Patent
Sloss

(10) Patent No.: US 6,761,387 B2
(45) Date of Patent: Jul. 13, 2004

(54) MOTORIZED LIFT ASSEMBLY FOR RACKS USED WITH FLAT BED TRUCKS AND TRAILERS

(76) Inventor: Glenn Sloss, 218 Applegate La., East Brunswick, NJ (US) 08816

( * ) Notice: Subject to any disclaimer, the term of this patent is extended or adjusted under 35 U.S.C. 154(b) by 0 days.

(21) Appl. No.: 10/228,345

(22) Filed: Aug. 26, 2002

(65) Prior Publication Data

US 2004/0036308 A1 Feb. 26, 2004

(51) Int. Cl.[7] ................................................ B60P 3/00
(52) U.S. Cl. .......................... 296/3; 296/26.05; 414/495
(58) Field of Search .................... 296/3, 26.05, 171, 296/156, 165; 254/102; 180/24.08; 414/498, 459, 495; 52/118

(56) References Cited

U.S. PATENT DOCUMENTS

| | | | | |
|---|---|---|---|---|
| 2,069,012 A | * | 1/1937 | Lynes ........................... 254/102 |
| 2,153,530 A | * | 4/1939 | Trinkler ........................ 254/102 |
| 2,720,414 A | | 10/1955 | Hart .............................. 296/12 |
| 3,061,358 A | * | 10/1962 | Lien ........................... 296/26.05 |
| 3,507,535 A | * | 4/1970 | Wallace ...................... 296/26.05 |
| 3,519,306 A | * | 7/1970 | Young .......................... 296/171 |
| 3,674,305 A | * | 7/1972 | Steury ........................... 296/156 |
| 3,743,044 A | * | 7/1973 | Scheele ...................... 180/24.08 |
| 3,743,345 A | | 7/1973 | Eckman et al. ............ 296/23 R |
| 3,749,439 A | * | 7/1973 | Ferguson .................. 296/26.05 |
| 3,758,074 A | * | 9/1973 | Jeffries et al. ............... 414/498 |
| 4,171,843 A | * | 10/1979 | Steury ........................... 296/171 |
| 4,328,989 A | * | 5/1982 | Childers ..................... 296/26.05 |
| 4,392,682 A | * | 7/1983 | Norkus, Jr. ................ 296/26.05 |
| 4,491,452 A | * | 1/1985 | Matovich ...................... 414/459 |
| 4,603,901 A | * | 8/1986 | McIntosh et al. ......... 296/26.05 |
| 5,035,094 A | * | 7/1991 | Legare ........................... 52/118 |
| 5,190,337 A | | 3/1993 | McDaniel ........................ 296/3 |
| 5,417,540 A | * | 5/1995 | Cox ............................. 414/495 |
| 5,423,587 A | | 6/1995 | Ingram ........................... 296/3 |
| 5,476,301 A | | 12/1995 | Berkich .......................... 296/3 |
| 5,505,515 A | * | 4/1996 | Turner ...................... 296/26.05 |
| 5,628,540 A | | 5/1997 | James ............................. 296/3 |
| 5,848,870 A | * | 12/1998 | Smith et al. .............. 296/26.05 |
| 5,951,096 A | * | 9/1999 | Steury et al. ............. 296/26.05 |
| 6,033,002 A | | 3/2000 | Clare et al. ..................... 296/3 |
| 6,071,062 A | * | 6/2000 | Warhurst et al. ............ 414/498 |
| 6,171,048 B1 | * | 1/2001 | Grimes ........................ 414/495 |
| 6,196,604 B1 | * | 3/2001 | Hoh et al. ................ 296/26.05 |
| 6,206,456 B1 | * | 3/2001 | Steury et al. ............. 296/26.05 |
| 6,325,447 B1 | * | 12/2001 | Kuo ............................ 296/165 |
| 6,409,186 B2 | * | 6/2002 | Bennington ................. 414/495 |
| 6,447,038 B1 | * | 9/2002 | Davis et al. .............. 296/26.05 |

* cited by examiner

*Primary Examiner*—Kiran Patel
(74) *Attorney, Agent, or Firm*—Sandra M. Kotin

(57) ABSTRACT

A lift assembly that can be reversibly installed in the bed of a pick-up truck or other flat bed transport means. At least four telescoping support legs are disposed at the four corners of the truck bed and support the upper rails on which the load is placed. The support legs are made up of a series of nested threaded segments driven by a similarly threaded drive shaft. A reversible motor associated with each support leg enables the segments to rotate in a forward direction to raise the load and to rotate in the reverse direction to lower the load. The motors are activated simultaneously and powered by the truck battery. The raising and lowering motion is smooth and continuous and can be stopped at any desired height. The lift assembly enables the height of the load to be easily changed by one person without any disturbance or shifting of the load. Telescoping braces are available to stabilize the support legs when fully extended and protective sleeves can be used to eliminate damage to the mechanism from environmental contaminants.

31 Claims, 25 Drawing Sheets

FIG. 7C
FIG. 7D
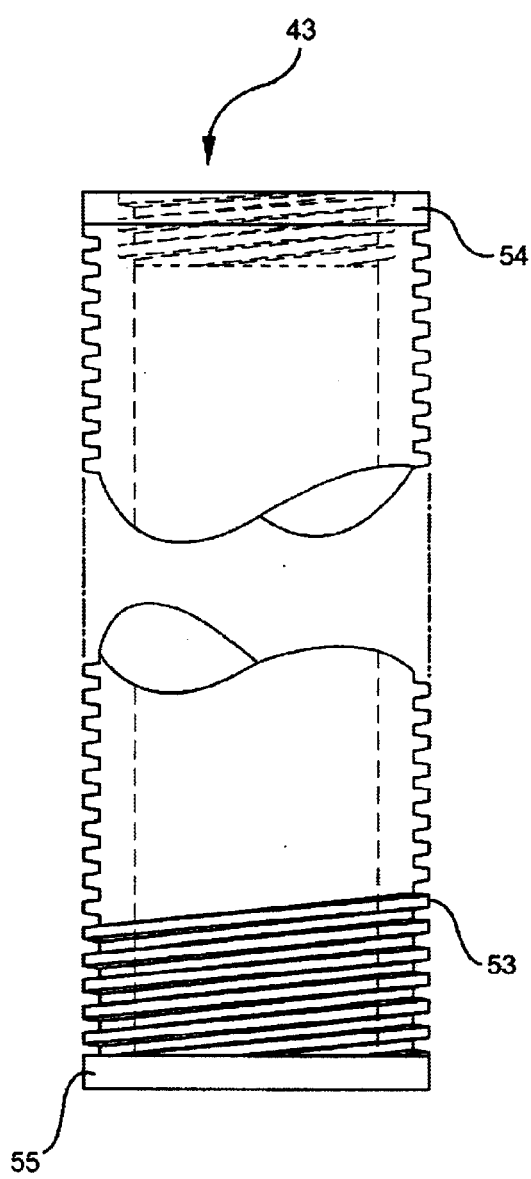
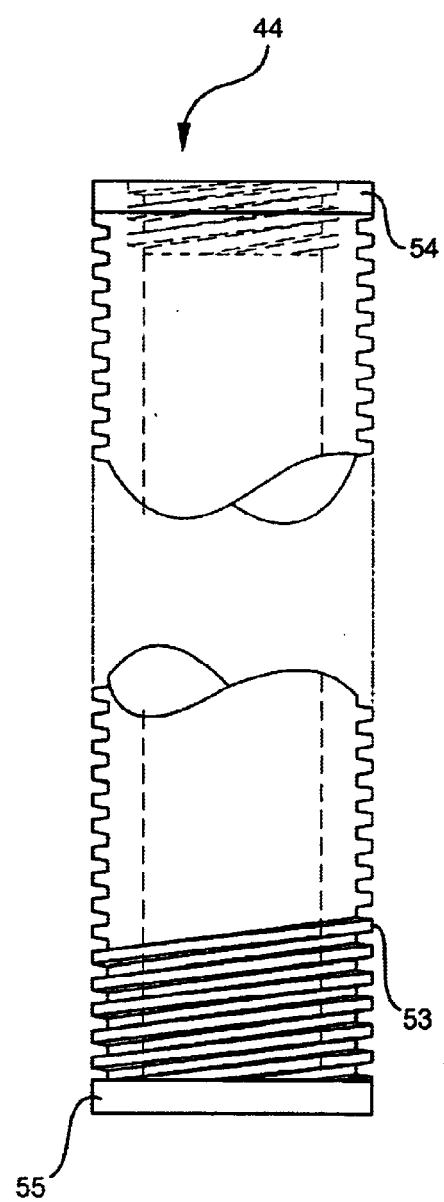

FIG. 8C
FIG. 8D
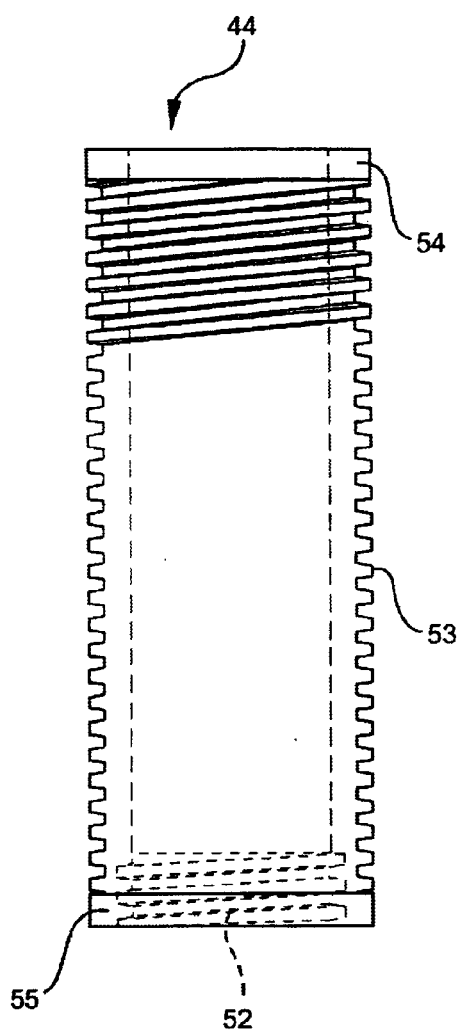
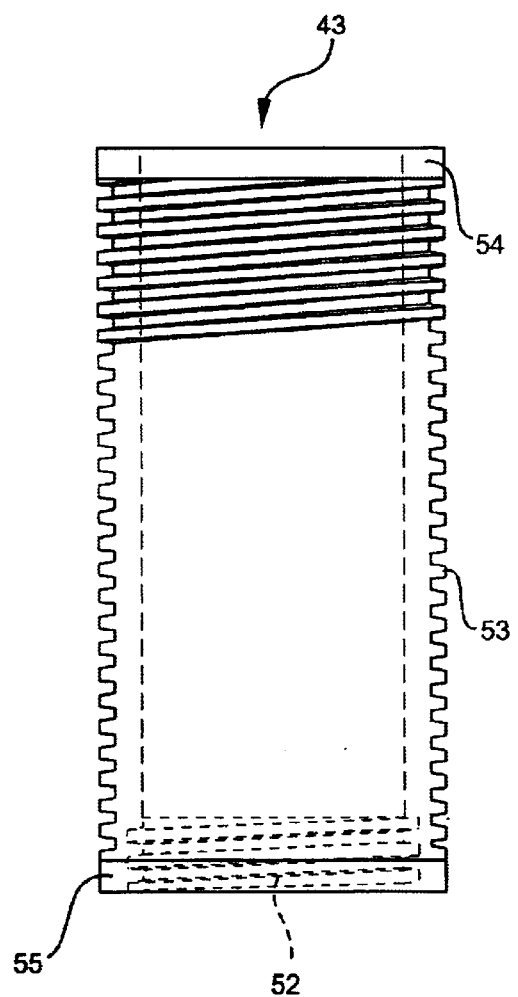

FIG. 18B
FIG. 18A
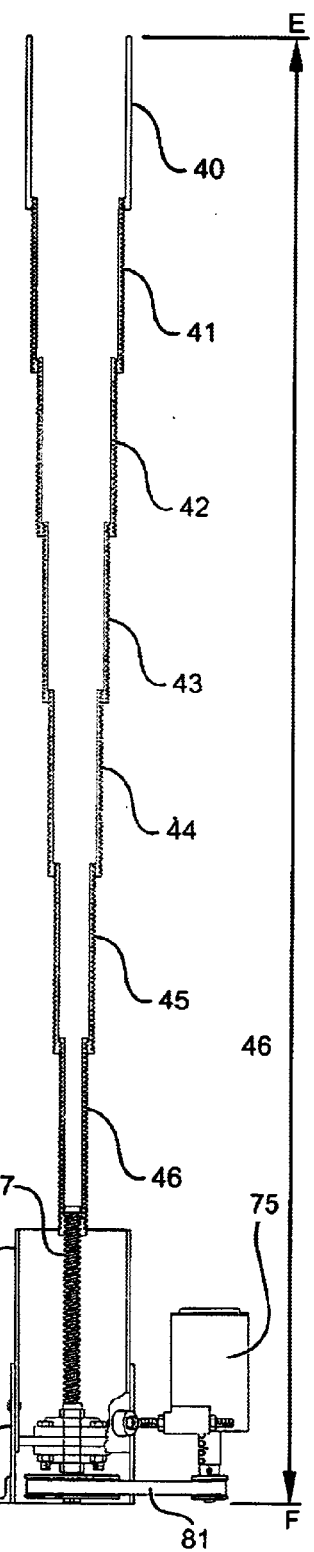
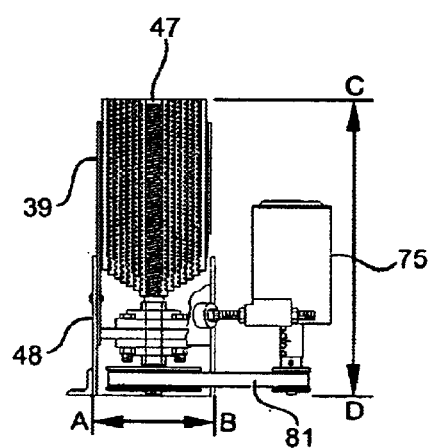

MOTORIZED LIFT ASSEMBLY FOR RACKS USED WITH FLAT BED TRUCKS AND TRAILERS

FIELD OF THE INVENTION

The instant invention relates to a carrier rack lift assembly for use with pick-up trucks, flat bed trucks and trailers and more particularly to a lift assembly having telescoping support members that can be raised to any desired height within a specified range for supporting and maintaining a wide variety of loads.

BACKGROUND OF THE INVENTION

The well known truck racks are used to increase the usefulness of pick-up trucks, flat bed trucks and trailers. Many of the prior art racks must be permanently fastened to the truck bed and are available at one specific height. Some may be adjustable to two or three preset heights while a few may exhibit a wider range of adjustability. In most of the adjustable prior art racks, any change in the height of the rack must be accomplished when there is no load resting on the upper portion of the rack and require more than one person to effect the change. The prior art racks are, in actuality, merely support frames with limited versatility. They are not designed to be completely height adjustable nor are they designed for adjustability under heavy loads. Changes in height cannot be made by one person. None of the prior art rack assemblies are meant to secure the interior of the truck bed or to provide any other functions.

Hart, in U.S. Pat. No. 2,720,414, describes a rack that is made in sections and is mounted on the body of a pick-up truck. All four sides of the rack are horizontally adjustable to fit a variety of truck bed lengths. Each of the four vertical support posts have one height adjustable member which can raise the upper horizontal supports high enough so that long boards can be extended over the cab of the truck. Both horizontal and vertical adjustments are made possible with outer tubes having multiple openings along their open ends and inner tubes with one opening. The inner tubes are inserted into the outer tubes to the desired distance and secured in place with pins. A load being supported on the rack must be completely removed in order to alter its height and more than one person would be needed to accomplish this. The rack cannot be collapsed and, if not needed, the entire rack must be removed from the truck bed and stored elsewhere.

In U.S. Pat. No. 5,190,337, McDaniel discloses a collapsible rack for use within the bed of a pick-up truck. The rack has four vertical legs, each having two segments connected by a knuckle joint which enables the legs to be folded downward when the rack is not in use. The bottom segments are pivotally mounted to base plates anchored to the truck bed and which run along its horizontal axis. An angled brace extending from mid base plate to the top of each rear leg gives added support to the frame when elevated. There is a side rail on each side of the rack mounted at the top of each pair of legs. A frame extension extends from each side rail over the cab to support long loads. The entire frame collapses flat along the sides of the truck bed when not in use and the parts of the rack fit within channels in the side rails for protection from the elements. The rack can only be used in the one elevated orientation and is stored in the collapsed orientation which takes up space in the truck bed.

An adjustable rack is taught by Berkich in U.S. Pat. No. 5,476,301. The height of the four vertical supports can be adjusted by raising the upper segments having a series of apertures and securing their positions with pins or bolts through corresponding apertures in the lower segments. The height of each support must be adjusted individually making it difficult to do while a load is supported on the rack. There are extensions of upper side rails over the cab that can reach as far as the front bumper, as well as rearward extensions beyond the tailgate. When the vertical supports are in the lowermost positions they rest below the sides of the truck and a cover, cap or camper can be used within the truck bed. This rack is not practical if the height of the rack must be changed with any frequency or with a load in place.

James, in U.S. Pat. No. 5,628,540, discloses another pick-up truck utility rack. The four vertical supports of this rack are mounted on the upper surfaces of the sides of the truck bed. There is a panel attached to the two forward supports which is hinged to pivot downward to form a shelf with a brace to limit the movement to 90°. A movable lower rail is attached to the rear supports and can be lowered to the level of the shelf with which it forms a second level to support a load. An extension can be used over the cab so that long boards can be carried. The vertical supports are of fixed length and once set in place remain stationery. Any load placed at mid-level can only be of the dimensions of the truck bed.

A camper for mounting in the bed of a pick-up truck is taught by Eckman et al. in U.S. Pat. No. 3,743,345. The camper has four telescoping corner support posts, each formed in three tubular sections that are square in cross section and have multiple apertures long their lengths. The supports are raised to the desired height and each segment is secured with a pin that is kept in place by a spring detent. There is a wood reinforced plastic roof that may be used in a horizontal orientation or it may be raised from one side to provide a slanted roof. A notched slotted bracket with a sliding bolt is used to set the angle of the roof. The roof height may be set at many different levels due to the many apertures in the tubular segments, but each post must be set individually. Once the roof is in place, adjustment to a different height may require more than one person. Canvas side flaps form the vertical walls of the camper. Horizontal arms secured to the uppermost sections of the corner support posts may be used to extend the camper space and can be covered by the canvas flaps. The entire camper unit can be removed and used as a tent independent of the truck. The canvas flaps only provide shelter from the elements but do not secure the interior of the camper. There is no way to raise all of the posts at the same time.

A lumber rack-camper as taught by Ingram in U.S. Pat. No. 5,423,587 has a non-adjustable rack frame which can be reversibly attached to the sides of a pick-up truck. There is an over-cab extension for carrying long boards and several cross rafters are supported on the tops of the corner vertical supports and intermediate posts supported on side frame members. A flexible cover is placed over the rafters to enclose the camper. The front of the cover fits over the extension and is supported by angled braces to proved and an air dam so the truck can travel at highway speeds while the camper cover is in place. Each side panel of the cover can be rolled up or down independently, but they do not secure the interior compartment. The corner supports are not adjustable.

Modifications to the side walls of a pick-up truck to provide secure storage compartments are taught by Clare et al. in U.S. Pat. No. 6,033,002. The storage compartments are hidden and built into the side walls. They are accessed through top mounted doors. A carrier rack that can be collapsed into the truck bed is also disclosed. The rack has a swivel mounted cab extension that folds backward for storage. The four supports for the rack may have two or three nesting segments and are adjustable by means of apertures and pins. When collapsed into the truck bed the rack cannot be seen from the outside. All adjustments to the height of the rack must be made one support at a time and only the storage compartments hidden in the side walls provide any security.

Though the prior art describes a variety of carrier racks for use with pick-up trucks, none of the prior art patents disclose a carrier rack lift assembly that can be raised and set at any desired height. Those with a degree of adjustability are limited to being set at specific levels according to the apertures in the support segments. None of the adjustable prior art rack lift means can easily be manipulated by one person. None of the prior art patents disclose an electrically powered carrier rack lift assembly that can be adjusted at the press of a button and raised to any desired height. And none of the prior art patents teach a rack lift assembly whereby any adjustment in height can be made with a full load of cargo in place. There is a need for a carrier rack lift assembly that exhibits all of the above-mentioned features and that is practical for use with all pick-up and flat bed trucks and carriers.

BRIEF SUMMARY OF THE INVENTION

The present invention may provide a carrier rack lift assembly for use with pick-up trucks, flat bed trucks and trailers. The lift assembly of the instant invention may be reversibly secured to the truck bed such that it may be removed when not needed. The essence of the lift assembly may be the four electrically activated support posts which may be completely collapsible to a height of only 13 inches (33 cm) from the truck bed and may be telescoped upward to a height of 65 inches (165 cm) from the truck bed. The support posts may also be set at any desired height in between by merely pushing a button. A roof cover in the form of a traditional cap or other such cover may be used with the lift assembly, and side panels may be added to enclose an interior compartment to make it secure from inclement weather conditions and outside tampering.

It is an object of the present invention to provide a carrier rack lift assembly that can be set at any desired height without the incremental limitations requiring specific openings in the telescoping support posts.

It is another object of the present invention to provide a lift assembly that is reversibly attached to the truck bed such that it can be removed when not needed.

A further object of the present invention is to provide a lift assembly that is operated electrically so that it can be manipulated by the touch of a button.

A still further object of the present invention is to provide a lift assembly that can be operated by one person.

Another object of the present invention is to provide a lift assembly that is adjustable and permits the height to be changed with a full load of cargo in place.

A still further object of the present invention to provide a lift assembly that can support a variety of upper rail systems.

A further object of the present invention is to provide a lift assembly that can support and raise loads of considerable weight at the push of a button.

It is another object of the present invention to provide a lift assembly that can be electrically wired such that the telescoping support posts can be raised simultaneously or in any desired combination or sequence.

Another object of the present invention is to provide a lift assembly that can be used with conventional truck caps or other roof covers.

The present invention is a rack lift assembly, for use with pick-up trucks, flat bed trucks and trailers having a horizontal cargo bed, and being capable of raising and supporting an elevated utility rack. The rack assembly comprises at least four telescoping support legs, each situated at a corner of the cargo bed, and each of the support legs comprising a series of nested rotatable cylindrical segments, an outer first segment and at least one inner second segment, the first segment being smooth on its exterior surface and having at least two threads situated at the bottom of its interior surface, and the second segment being threaded on its exterior surface, having a stop means at the top of its exterior surface and a stop means at the bottom of its exterior surface, and having at least two threads situated at the bottom of its interior surface. The stop means is to prevent the segments from becoming dissociated. There is a canister for containment of the segments; a support frame to support the canister on the cargo bed; a drive shaft to rotate the segments, the drive shaft being positioned axially within the nested segments, being threaded for substantially the upper three fourths of its length, and having a stop means at its top and another stop means situated below the threads, the stop means for preventing the drive shaft from becoming dissociated from said segments. The threads on the segments and the drive shaft are of the same dimensions for cooperation therebetween. There is a means to rotate the drive shaft in a forward direction and in a reverse direction and a top cap to which the rack is affixed. When a utility rack is supported on the four support legs and the rotation means causes the drive shafts to be rotated in the forward direction the segments rotate in the forward direction and move upward such that the support legs telescope upward raising the utility rack, and when the rotation means causes the drive shaft to be rotated in the reverse direction the segments rotate in the reverse direction and are moved downward such that the support legs are collapsed and the utility rack is lowered.

The present invention is also a lift assembly for smoothly raising and lowering a load. The lift assembly comprises a series of nested rotatable cylindrical segments, an outer first segment being smooth on its exterior surface and having at least two threads situated at the bottom of its interior surface, at least one inner second segment being threaded on its exterior surface, having a collar about the top of its exterior surface and a collar about the bottom of its exterior surface and having at least two threads situated at the bottom of its interior surface. There is a canister for containment of the segments, a support frame to support the canister on a horizontal surface, a drive shaft to rotate said segments the drive shaft being positioned axially within the nested segments, being threaded for substantially the upper three fourths of its length, and having a first collar about its top and a second collar situated below the threads. The threads on the segments and the drive shaft being of the same dimensions for cooperation therebetween, and the collars on the segments and the drive shaft being capable of acting as stops to prevent said segments from becoming dissociated. There is a rotation means to rotate the drive shaft in a forward direction and in a reverse direction and a cylindrical top cap on which the load is supported. When the load is supported on the lift assembly and the rotation means causes the drive shaft to be rotated in the forward direction the segments rotate in the forward direction and move upward such that the lift assembly telescopes upward raising the load, and when the rotation means causes the drive shaft to be rotated in the reverse direction the segments rotate in the reverse direction and are moved downward such that the lift assembly is collapsed and the load is lowered.

Other features and advantages of the invention will be seen from the following description and drawings.

BRIEF DESCRIPTION OF THE DRAWINGS

FIG. 14-B is a s sectional view through line B—B of FIG. 14-A;

FIG. 17-B is a sectional view through line B—B of FIG. 17-A;

FIG. 18-A is a side partial cutaway view of the complete lifting mechanism in the fully collapsed orientation;

FIG. 18-B is a side partial cutaway view of the complete lifting mechanism in the fully extended orientation;

DETAILED DESCRIPTION OF THE INVENTION

Figure 1:
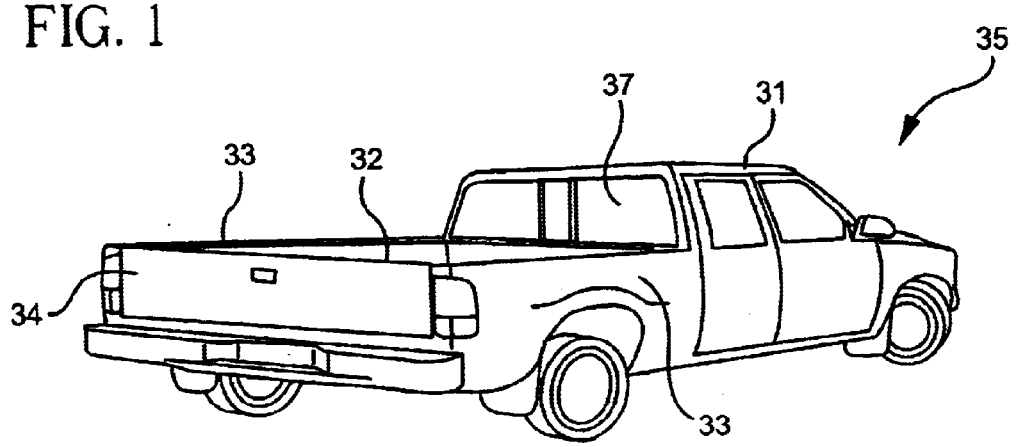
FIG. 1 is a rear perspective view of a typical pick-up truck.

The carrier rack lift assembly 30 of the instant invention may be collapsible to a height of only 13 inches (33 cm) and may telescope to a height of 65 inches (165 cm) from the supporting surface. The lift assembly 30 may be compatible for use with a typical pick-up truck 35 (FIG. 1) which may have a cab 31, a flat truck bed 32, side panels 33 and a tailgate 34. The lift assembly 30 may just as easily be used with a flat bed truck (not illustrated) or trailer 82. The lift assembly 30 may be raised or lowered to any desired level from the fully collapsed orientation to the fully extended orientation. When fully extended, the top of the lift assembly with accompanying cargo rails 36 may reach a height of six feet above the truck bed 32. The fully collapsed lift assembly 30 may not be visible above the side panels 33 of the pick-up truck 35.

Figure 2:
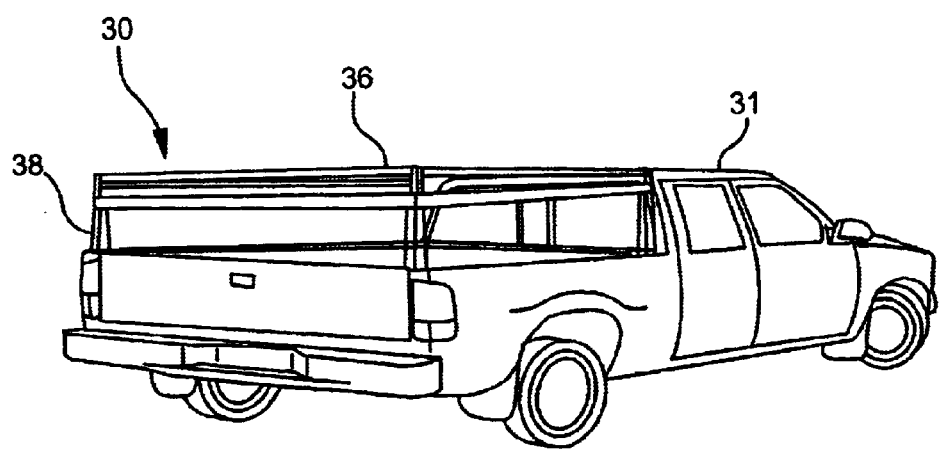
FIG. 2 is a rear perspective view of the pick-up truck with the rack of the instant invention raised to the level of the truck cab.
Figure 3:
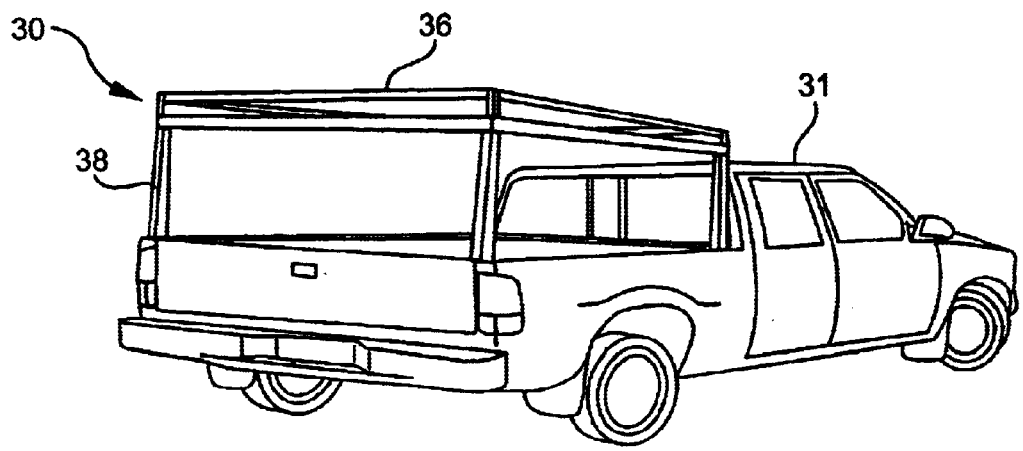
FIG. 3 is a rear perspective view of the pick-up truck with the rack raised to a level above the truck cab.
Figure 4:
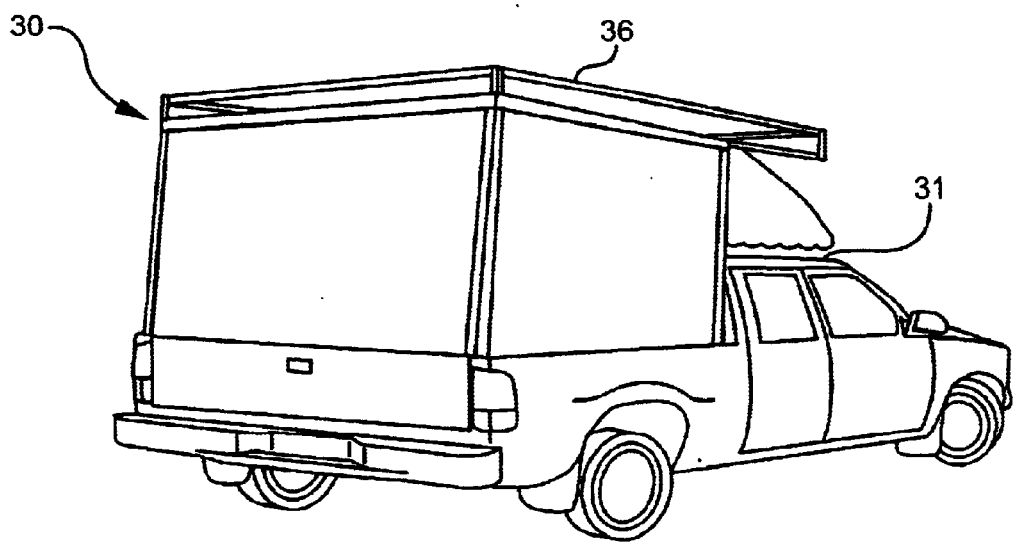
FIG. 4 is a rear perspective view of the pick-up truck with the rack raised to its full height and with side panels lowered to fully enclose the truck bed.
Figure 5:
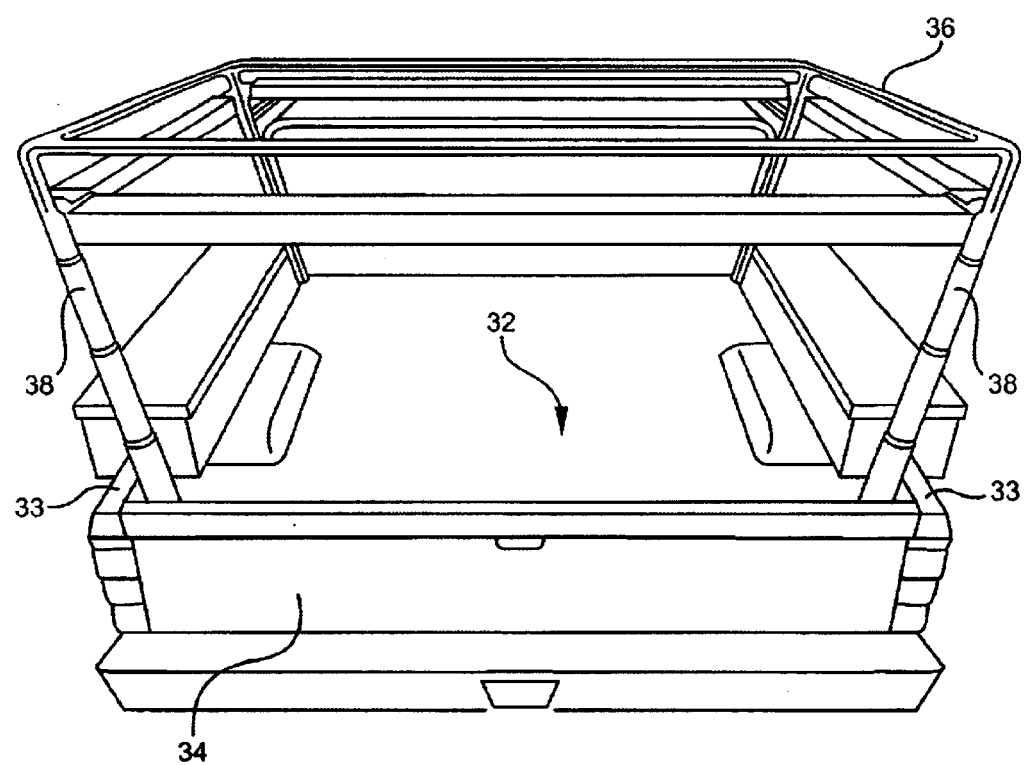
FIG. 5 is a rear view of the truck of FIG. 3.

The truck 35 with the lift assembly 30 partially extended so that it may be observed above the side panels 33 may be seen in FIG. 2. At this level the upper rails 36 situated at the top of the lift assembly 30 may accommodate various loads as long as they do not extend more than a few inches beyond the longitudinal dimensions of the rails 36 to insure that the objects placed on the rails 36 cannot strike the rear window 37 of the cab 31. The lift assembly 30 may be raised further to levels above the top of the cab 31, as seen in FIGS. 3 and 5 to accommodate longer loads. The fully extended rack 30 may be seen in FIG. 4.

The lift assembly 30 may consist of four telescoping support legs 38 which may form the supporting structure for the rails 36. The support legs 38 may be raised or lowered by means of an electric motor 73 powered by the truck's battery pack (not illustrated). A manual raising means may also be used, but is not illustrated or described herein.

Figure 6:
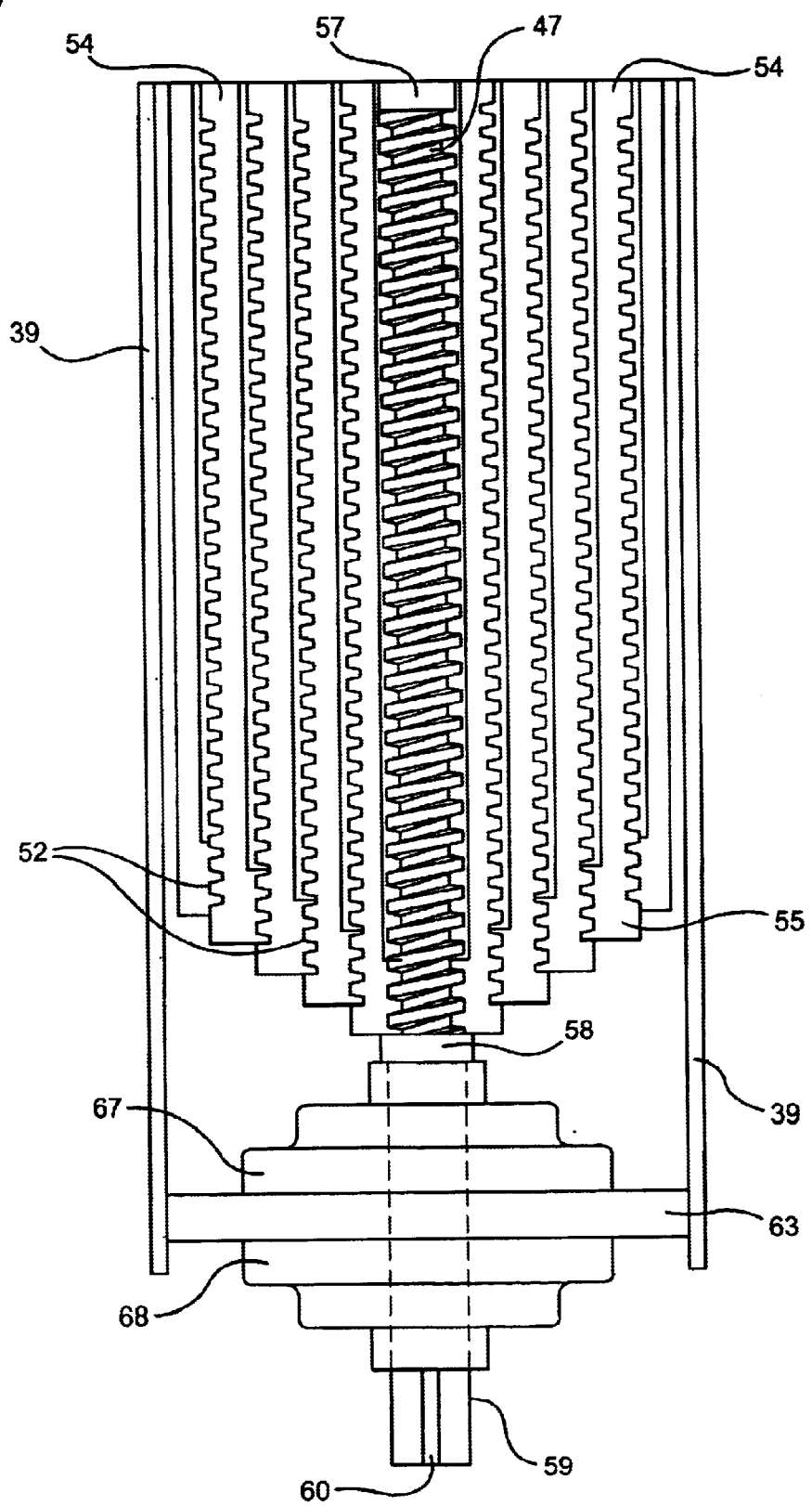
FIG. 6 a schematic cutaway view of the main components of the lifting mechanism.
Figure 7B:
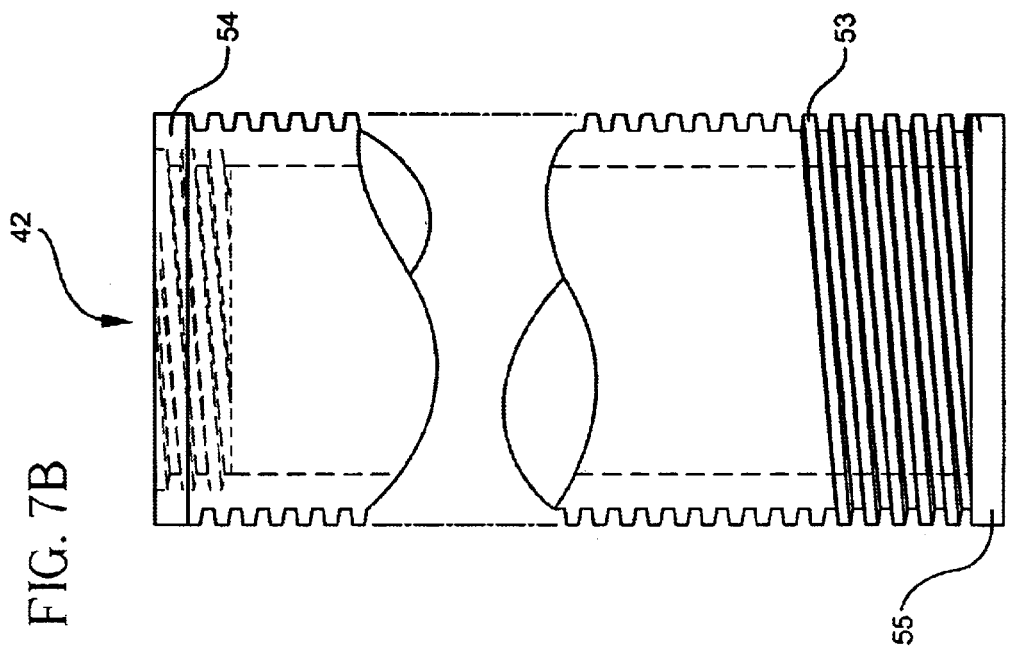
FIGS. 7-A through 7-F are schematic cutaway views of six of the threaded segments.
Figure 7A:
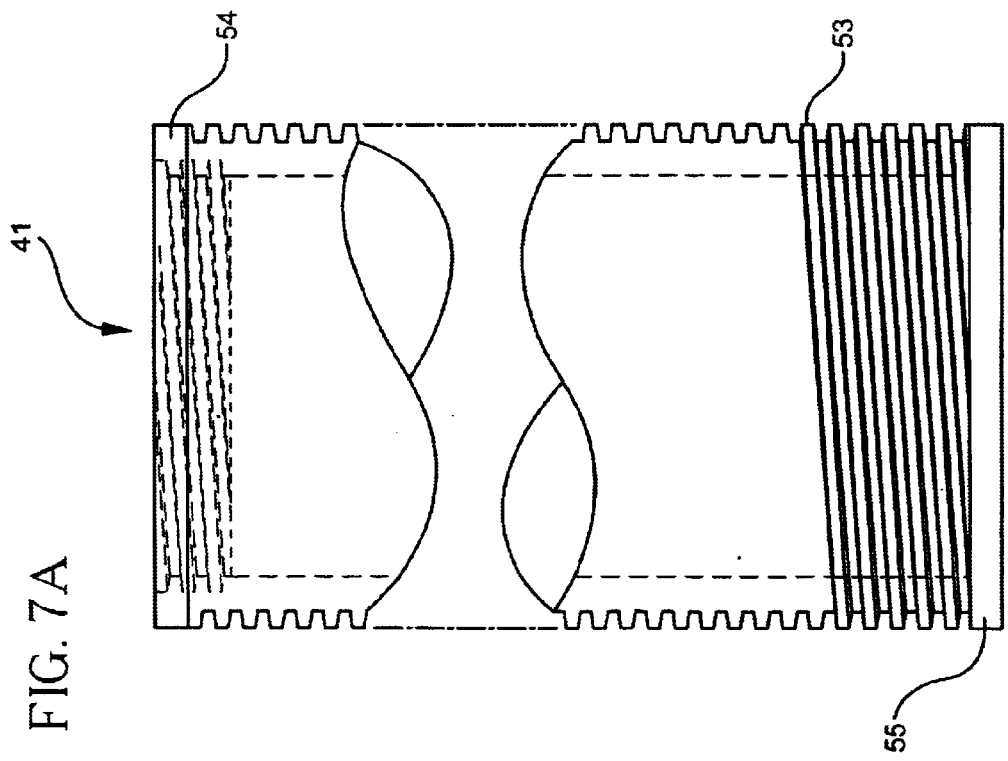
Figure 7E:
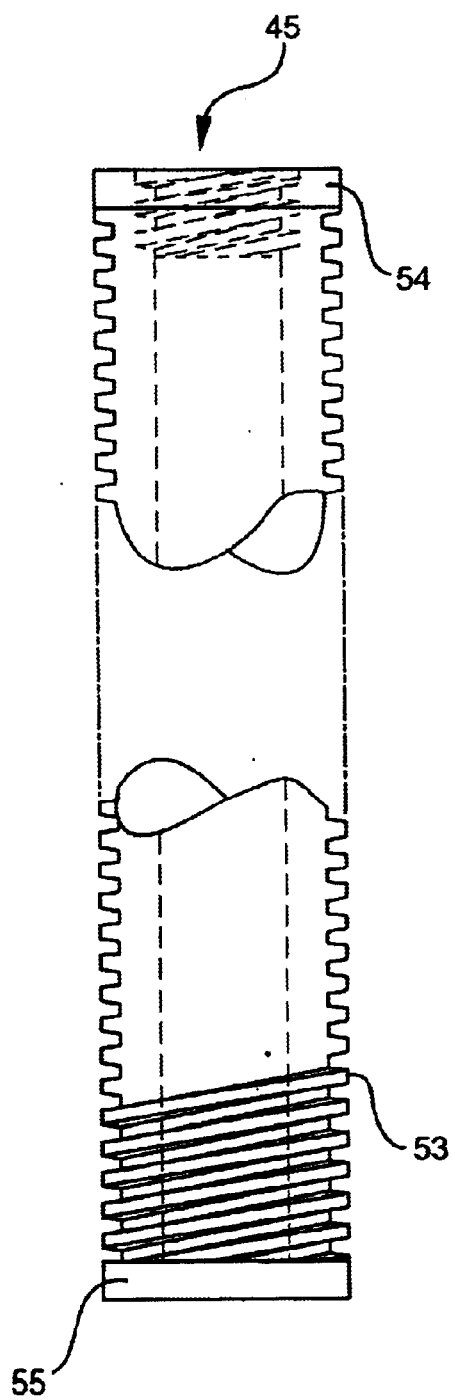
Figure 7F:
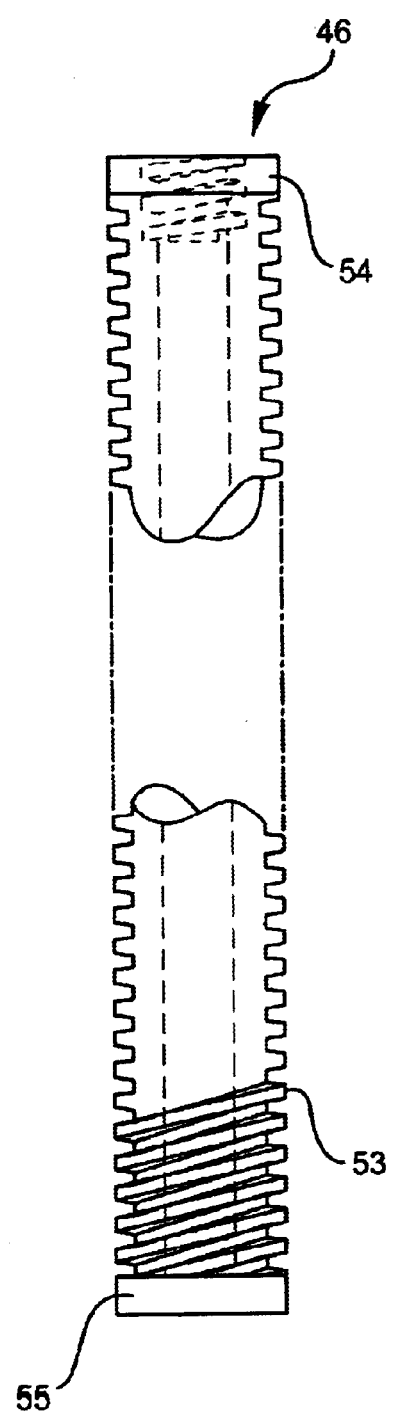
Figure 10:
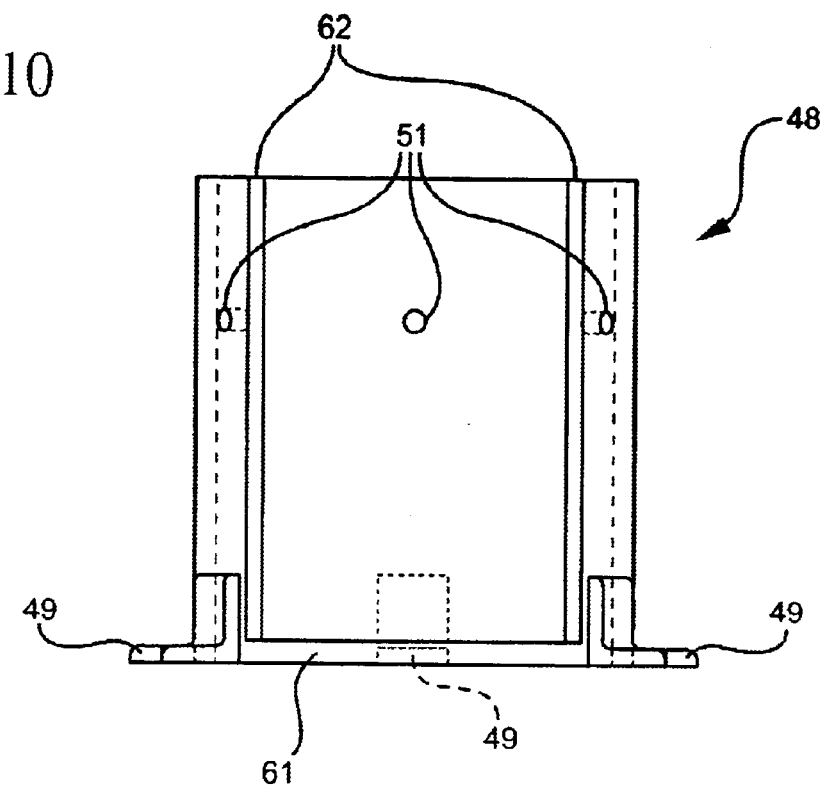
FIG. 10 is schematic cutaway view of the support frame.
Figure 11:
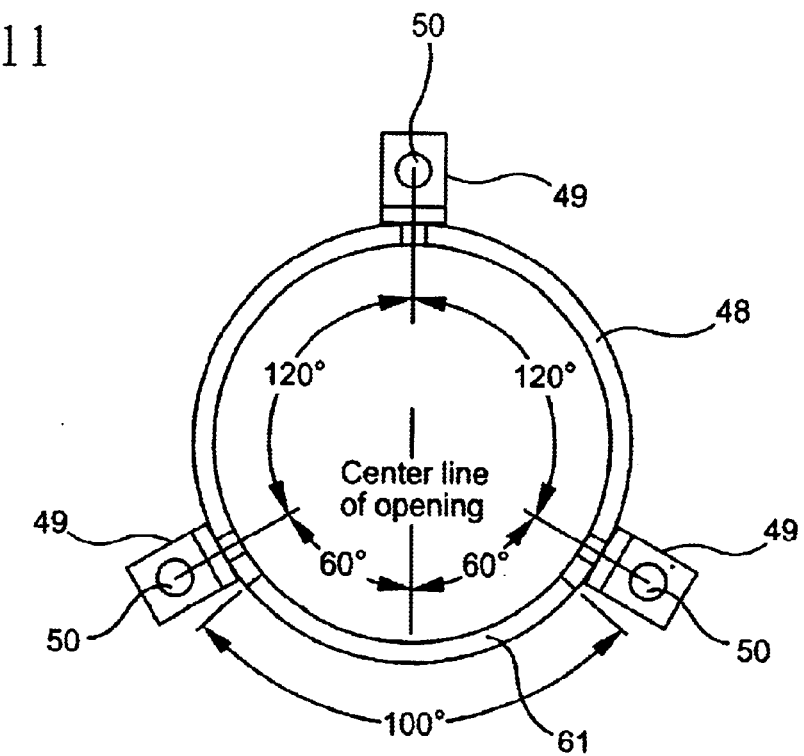
FIG. 11 is top plan view of the support frame of FIG. 10.

Each support leg 38 may be comprised of a series of nested segments. The number of segments may determine the height of the fully extended support leg 38. In the preferred embodiment, for use in pick-up trucks, each support leg may consist of seven nested segments 40–46 and a central drive shaft 47 contained within a cylindrical canister 39. See FIG. 15. (FIG. 6 shows the major parts but only five segments.) The canister 39 may act as a housing for the segments of the support leg 38. A support frame 48 (FIGS. 10 and 11) may surround substantially three fourths of the circumference of the bottom third of the canister 39 and may serve to support the canister above the truck bed 32 a sufficient distance to allow the necessary moving parts to function properly. There may be three evenly spaced flanges 49 welded to the outside surface of the support frame 48 along its bottom edge. A band 61 may extend from one vertical edge 62 to the other vertical edge 62 of the support frame 48 such that the bottom edge of the support frame 48 that makes contact with the truck bed 32 may form a complete circle and may provide maximum stability to the support leg 38. The flanges 49 may have openings 50 to accommodate bolts (not shown) used to anchor the support legs 38 to the truck bed 32. There may be three bolts 51 passing through openings in the wall of the support frame 48 above the flanges 49 which may secure the support frame 48 to the canister 39.

Figure 8A:
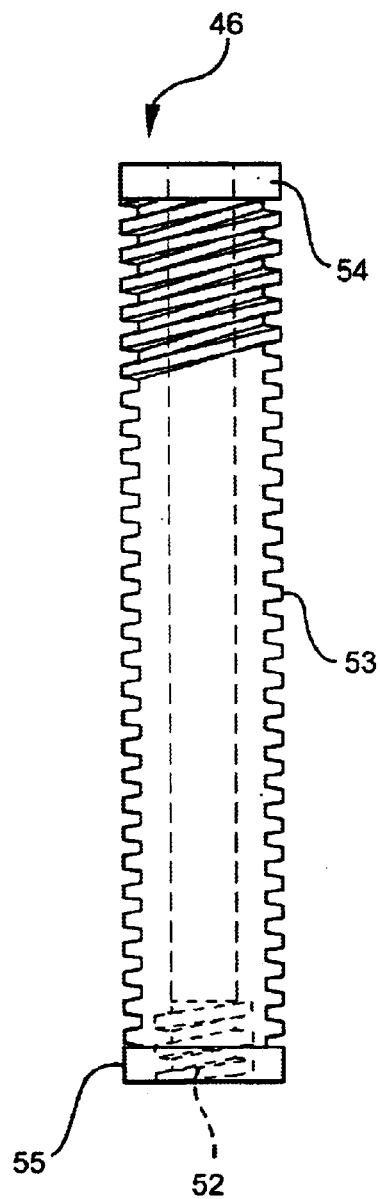
FIGS. 8-A through 8-D are schematic cutaway scale views of the four innermost segments.
Figure 8B:
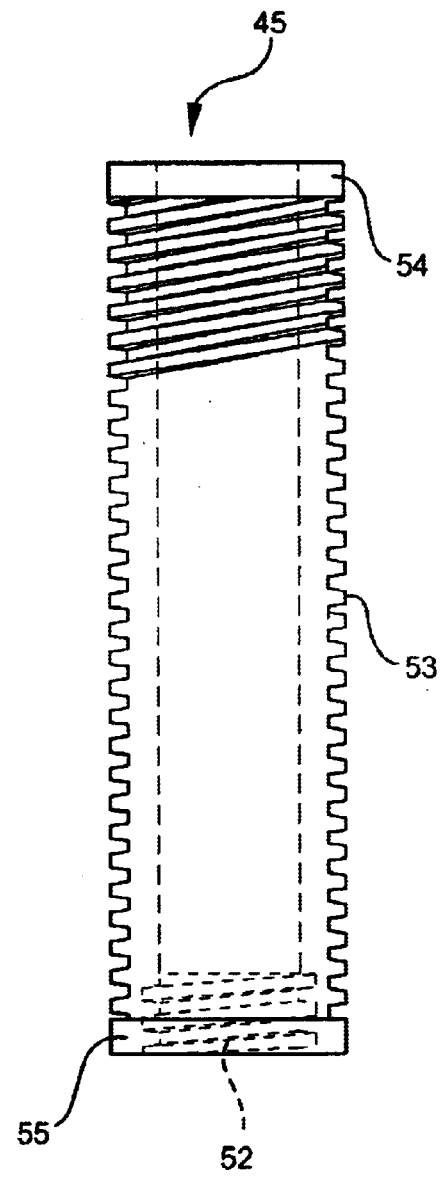
Figure 9:
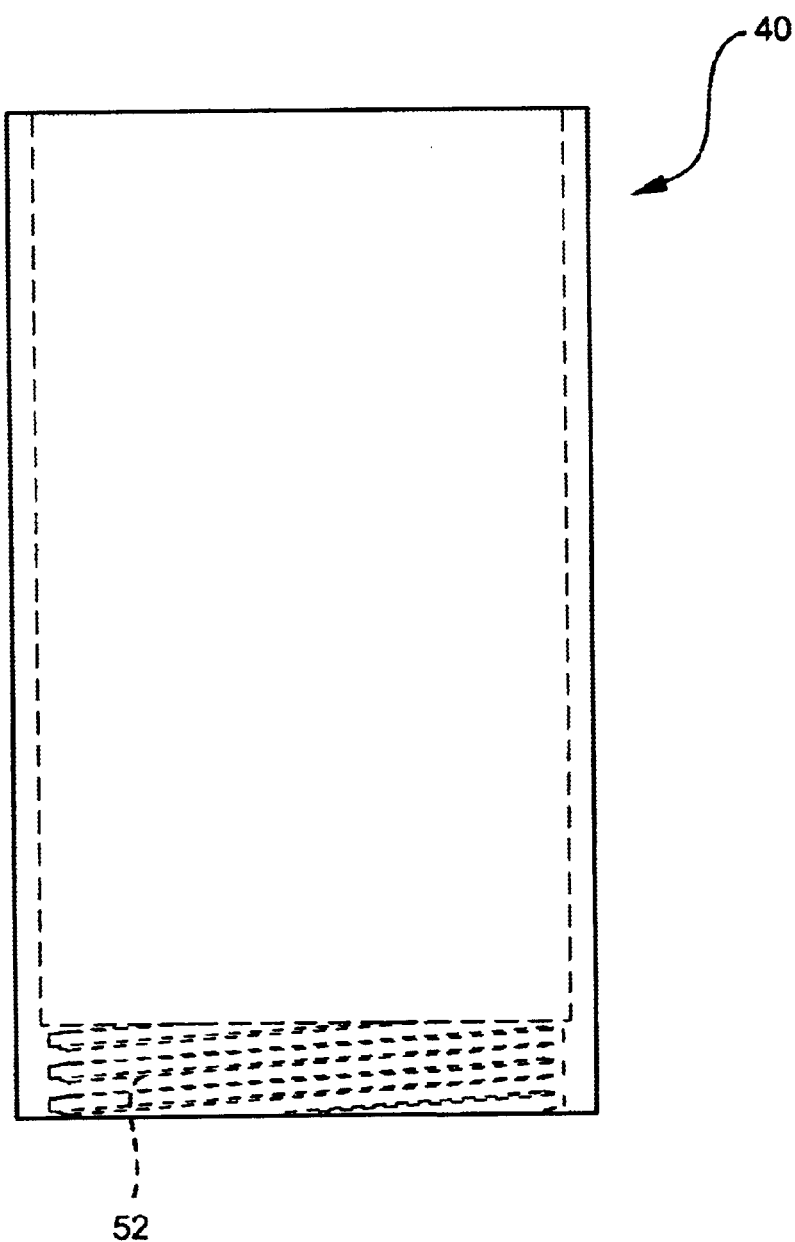
FIG. 9 is a schematic cutaway view of the outermost segment.

The seven segments 40–46 of the support leg 38 may be cylindrical and successively and incrementally smaller in diameter and longer in length. The outermost segment 40 (FIG. 9) may be the largest in diameter and the shortest in length. The outermost segment 40 may have a smooth outer surface and a smooth inner surface except for the presence of three threads 52 situated at the bottom interior edge. The other six segments 41–46 (FIGS. 7-A through 7-F) may each have threads 53 along their entire exterior surfaces and smooth interior surfaces with the same three threads 52 situated at the bottom interior edges. Each of the six segments 41–46 may also have a collar 54 around the top of the exterior surface and another collar 55 around the bottom of the exterior surface. FIGS. 8-A through 8-D provide slightly different views of four of the segments 43–46.

Figure 13:
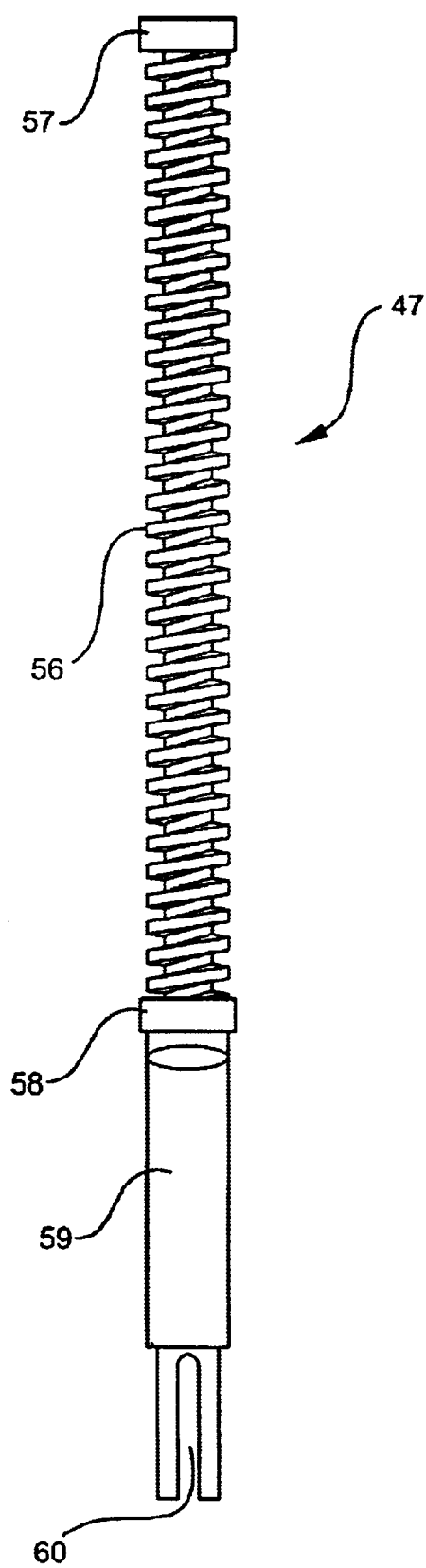
FIG. 13 is a side view of the drive shaft.

The drive shaft 47 (FIG. 13) may be axially situated within the innermost segment 46 and may be of solid construction with threads 56 along the upper ¾ of its exterior surface. There may be a collar 57 around the top of the drive shaft 47 and another collar 58 situated below the threads 56. The lower ¼ of the drive shaft 59 may have a smooth surface and the lower one inch (2.54 cm) of the drive shaft 47 may have a slightly smaller diameter and may be fitted with a vertically mounted flat sided key seat 60.

The threads on the inner and outer surfaces of all of the segments 40–46 and on the drive shaft 47 may all be 5 Acme threads. The collars 54, 55 on the outer surfaces of the segments 40–46 and the collars 57, 58 on the drive shaft 47 may all be welded to the segments 41–46 and drive shaft 47 and may be substantially ¼ inch (0.64 cm) wide and the depth of the threads (52, 53 and 56) which are all the same, as noted above.

Figure 12:
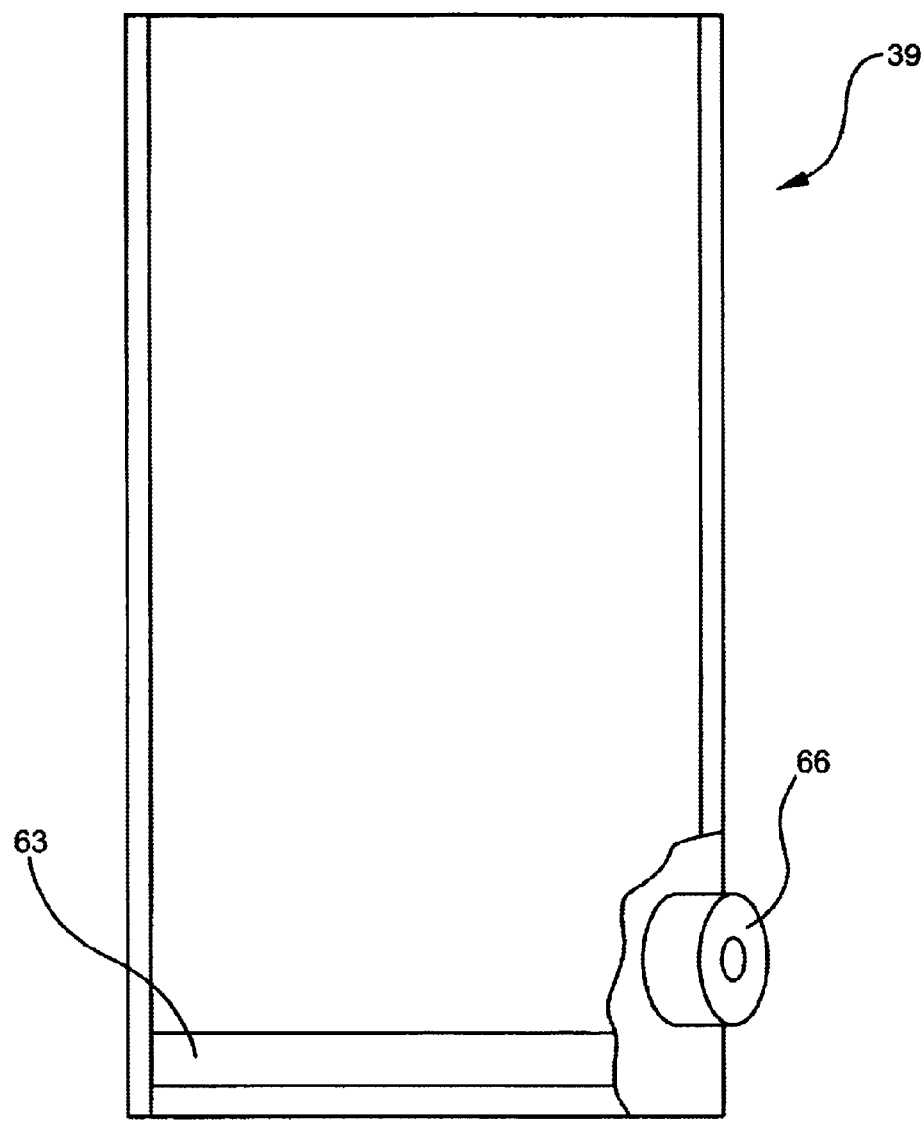
FIG. 12 is a partial cutaway view of the canister.
Figure 17A:
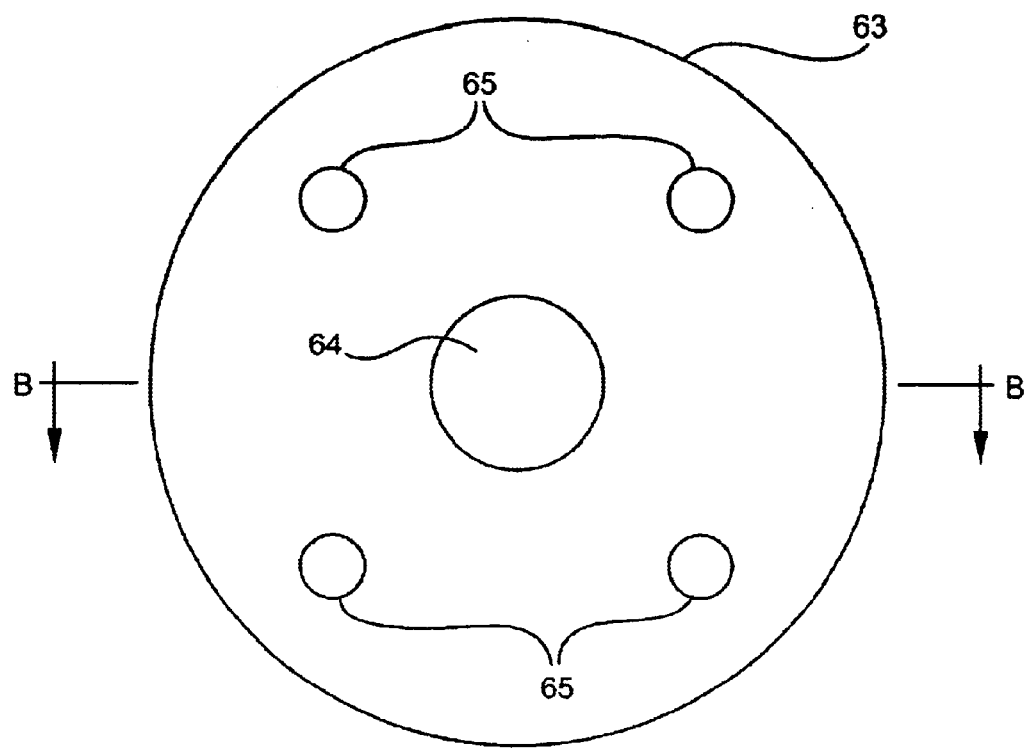
FIG. 17-A is a top plan view of the bearing plate.
Figure 17B:
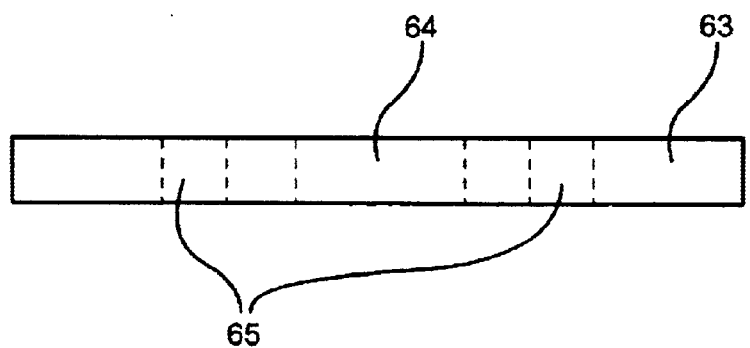

The cylindrical canister 39 (FIG. 12) may have smooth interior and exterior surfaces and may have a horizontal bearing plate 63 welded to the interior of the canister 39 just above the bottom edge. There may be a central opening 64 in the bearing plate 63 through which the drive shaft 47 may pass, and four evenly spaced smaller openings 65. (FIGS. 17-A and 17-B) An upper bearing 67 may be mounted on top of the bearing plate 63 and a lower bearing 68 may be mounted on the underside of the bearing plate 63. The upper bearing 67 and lower bearing 68 may be secured by bolts 69 passing through the small openings 65 in the bearing plate 63 and secured by nuts 70. The two bearings may assist in the smooth rotation of the drive shaft 47. There may be two mounting ferrules 66 welded to the exterior of the canister 39 just above the level of the bearing plate 63. The two mounting ferrules 66 may be situated within, and in close proximity to, the vertical edges 62 of the support frame 48.

Figure 14A:
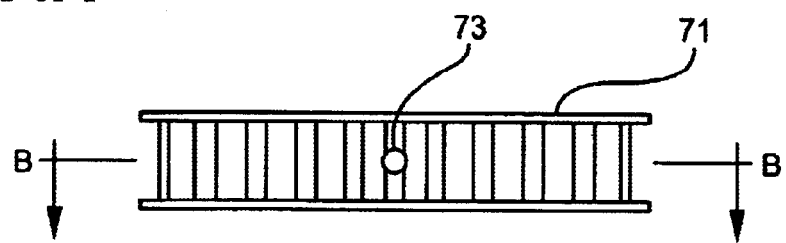
FIG. 14-A is a side view of the large Browning pulley.
Figure 14B:
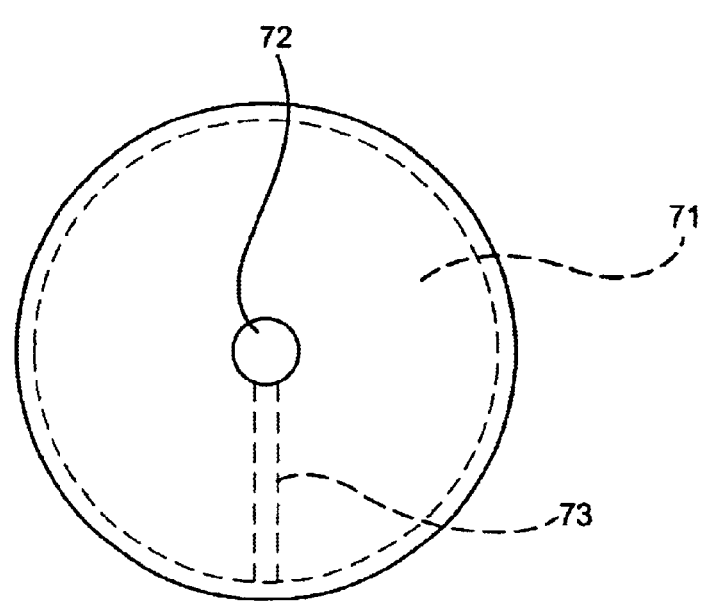

The lower end of the drive shaft 47 may pass through the upper bearing 67, the central opening 64 of the bearing plate 63 and extend below the lower bearing 68 to communicate with the central opening 72 of a large Browning pulley 71 which may be disposed below the lower bearing 68. The large Browning pulley 71 may have a channel 73 through the core extending from the central opening 72 to the perimeter. This channel 73 may be dimensioned to accept the key seat 60 of the drive shaft 47 to insure that there may be no slippage when the drive shaft 47 is rotated by the turning of the pulley 71, (FIGS. 14-A and 14-B).

Figure 15:
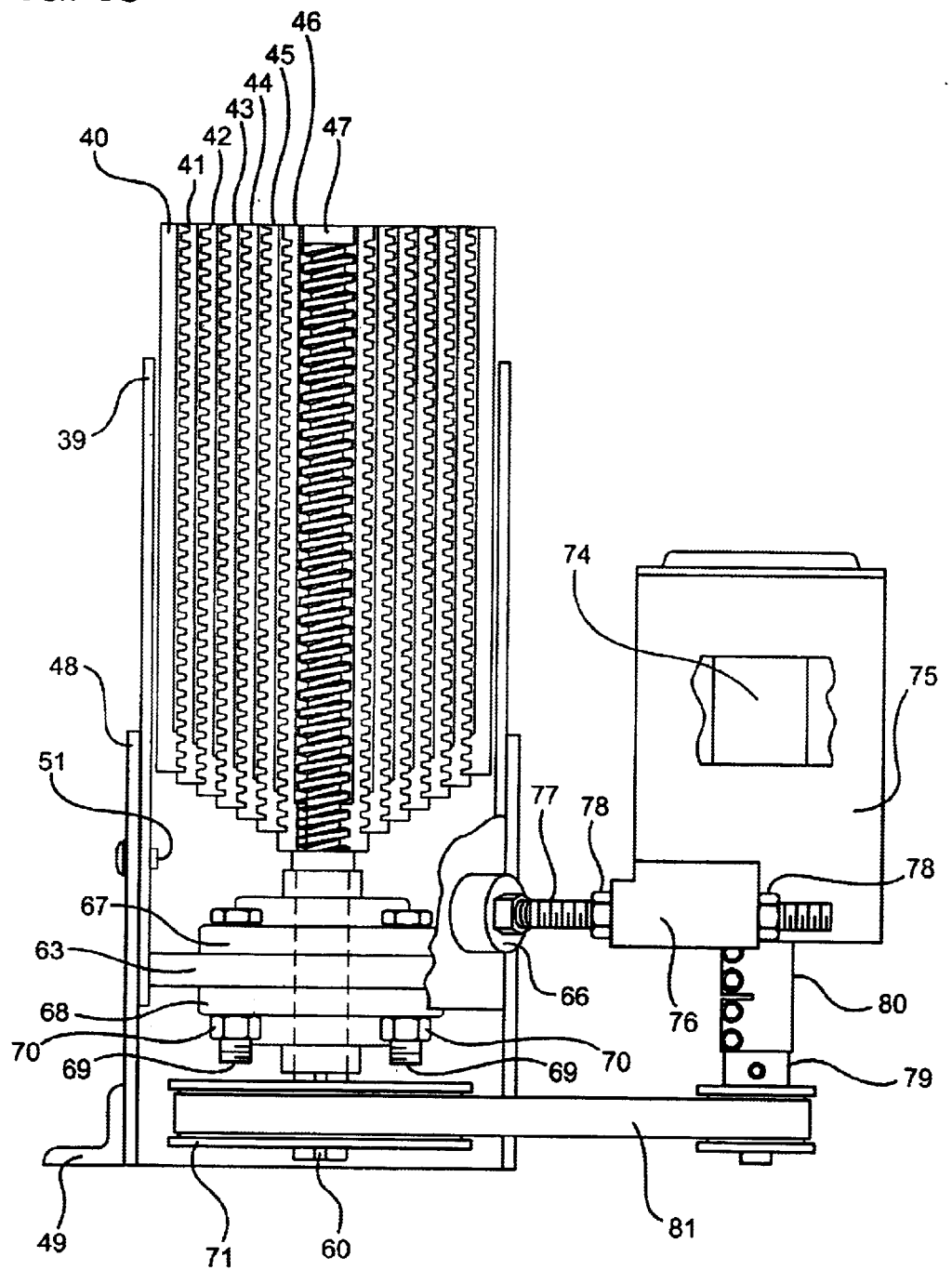
FIG. 15 is a schematic cutaway view of the complete lifting mechanism.
Figure 16:
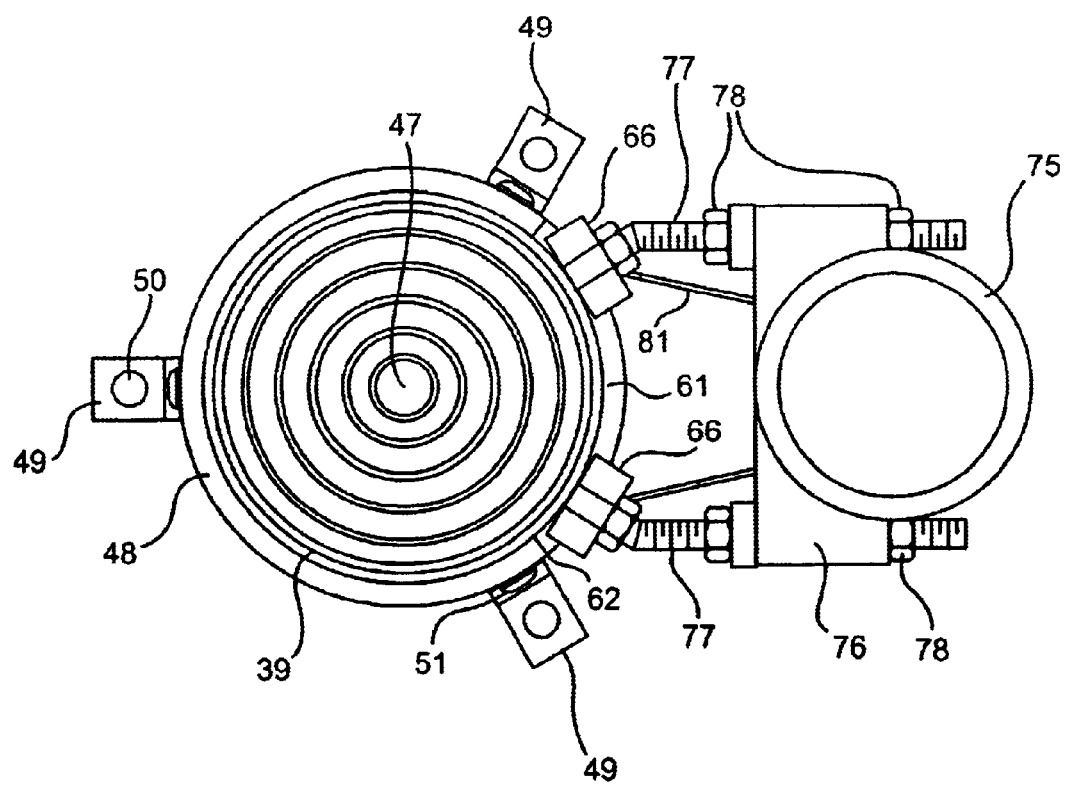
FIG. 16 is top plan view of the complete lifting mechanism.

Referring to FIG. 15, the large Browning pulley 71 may be made to turn by a motor 74 contained within a motor housing 75 that may be integral with a motor mount 76. The motor mount 76 may be secured to the support frame 48 by means of two long threaded studs 77 projecting from the ferrules 66 of the canister 39. The studs 77 may be bent to conform to the angles necessary to enable them to communicate with channels in the motor mount 76. Nuts 78 may be located on both sides of the motor mount 76 to hold it securely at a specific distance from the support frame 48. The nuts 78 may also permit adjustment of the distance of the motor mount 76 to the support frame 48 as described below.

The drive shaft of the motor 74 may be joined to a small Browning pulley 79 by a coupling 80. The small Browning pulley 79 may be rotated by the action of the motor 74 which may be powered by the truck battery (not illustrated). A Browning belt 81 may cooperate between the large Browning pulley 71 and the small Browning pulley 79 to rotate the drive shaft 47. The sizes of the large Browning pulley 71 and small Browning pulley 79 may be chosen to provide a 3:1 ratio, but other sizes may be selected to provide different ratios.

The Browning belt 81 may easily be changed or adjusted by loosening the nuts 78 and moving the motor mount 76 as needed along the studs 77. To change the belt 81, the motor mount 76 may be moved toward the support frame 48, the belt 81 loosened and removed and the new belt put in place. The motor mount 76 may thereafter be moved away from the support frame 48 until the new belt is taut and the nuts 78 are tightened. The adjustment of the distance of the motor mount 76 to the support frame 48 may determine the tension on the Browning belt 81.

In addition to the drive shaft being rotated by Browning pulleys and a Browning belt, the rotation may also be accomplished using a chain and sprocket assembly as well as a straight gear drive assembly consisting of two main gears and an idler gear. Neither the chain and sprocket assembly nor the straight gear drive is illustrated herein.

The support leg 38 may be made to rise as follows: when the motor 74 is activated the small Browning pulley 79, the Browning belt 81 and thereafter the large Browning pulley 71 may be caused to rotate and with them the drive shaft 47; as the drive shaft 47 rotates, all of the nested segments 40–46 may rotate with it. Once the drive shaft 47 and the segments 40–46 revolve any one of the segments may begin to crawl upward until the lower collar 55 of the rising segment contacts the upper collar 54 of the adjacent concentric segment and it can go no farther. As the segments continue to revolve another segment may begin to move upward with the collars acting as the stops. This action may continue until all of the segments have moved upward to their fullest height and the support leg 38 has reached its full extension. The segments in each leg may not necessarily move in the same sequence but since all of the threads are alike the tops of the support legs 38 may rise at the same rate. Reversing the motor may reverse the process. The motor 74 may be stopped at any point thus enabling the support leg 38 to be raised or lowered to any desired level.

Since the threads on the interior and exterior of all segments 40–46 and the drive shaft 47 are the same (Acme 5 threads), the fact that the segments may rise in different sequences in the various support legs 38 will not effect the height attained by each leg 38 as long as the motors for all four of the support legs 38 are activated at the same time. This may be accomplished by the manner of wiring the electrical system which may have all support legs 38 activated by the same switch. The lift assembly 30 may lift a wide variety of loads to any desired height and maintain the loads in the same degree of horizontal orientation. Once the support legs 38 have reached the desired height the switch may be released. The support legs 38 may remain quite stable and retain their load until the height of the support legs 38 is changed by again activating the switch.

FIG. 18-A shows the fully collapsed support leg 38. Line A-B may represent the width of the base of the leg which may be only 5 inches (12.7 cm) and line C-D may represent the overall height of 13 inches (33 cm). The fully extended support leg 38 may be seen in FIG. 18-B wherein line E-F may represent the fully extended height of 65 inches (165 cm).

The pick-up truck bed 32 may accommodate four support legs 38, located in each of the four corners as seen in FIGS.

5 and 19. When used in a flat bed truck or trailer 82 (FIG. 26) six or more support legs may be needed.

The dimensions of the essential parts used in the preferred embodiment may be seen in Table I. The nested segments may be made of steel that is 0.625 in (1.588 cm) in thickness. A one horsepower motor may be used, as well as motors providing up to four horsepower. The preferred embodiment may utilize a 1.5 horsepower, 12 volt, 20 amp motor as exemplified by model #540-927-OM manufactured by FASCO. Pulleys having ratios other than 3:1 may provide different rates of rotation of the segments. The three threads 52 on the inside of each segment occupy the bottom ⅝ inch (1.59 cm) of the interior surfaces.

TABLE I

Dimensions of Preferred Embodiment

| Part | height (in) | (cm) | exterior diameter (in) | (cm) |
|---|---|---|---|---|
| Canister 39 | 9½ | 24.1 | 5¾ | 14.6 |
| Segment 40 | 7⁹⁄₁₆ | 19.2 | 4⁵⁄₁₆ | 10.9 |
| Segment 41 | 7²⁵⁄₃₂ | 19.8 | 3¹⁵⁄₁₆ | 10 |
| Segment 42 | 8¹⁄₃₂ | 20.4 | 3⅜ | 8.6 |
| Segment 43 | 8⁵⁄₁₆ | 21.1 | 2¹³⁄₁₆ | 7.1 |
| Segment 44 | 8½ | 21.6 | 2¼ | 5.7 |
| Segment 45 | 8¹³⁄₁₆ | 22.4 | 1¹¹⁄₁₆ | 4.3 |
| Segment 46 | 9 | 22.9 | 1⅛ | 2.9 |
| Drive Shaft 47 | 12³¹⁄₃₂ | 32.9 | ¾ | 1.9 |
| Support Frame 48 | 5⁹⁄₁₆ | 14.1 | 5 | 12.7 |

Figure 21:
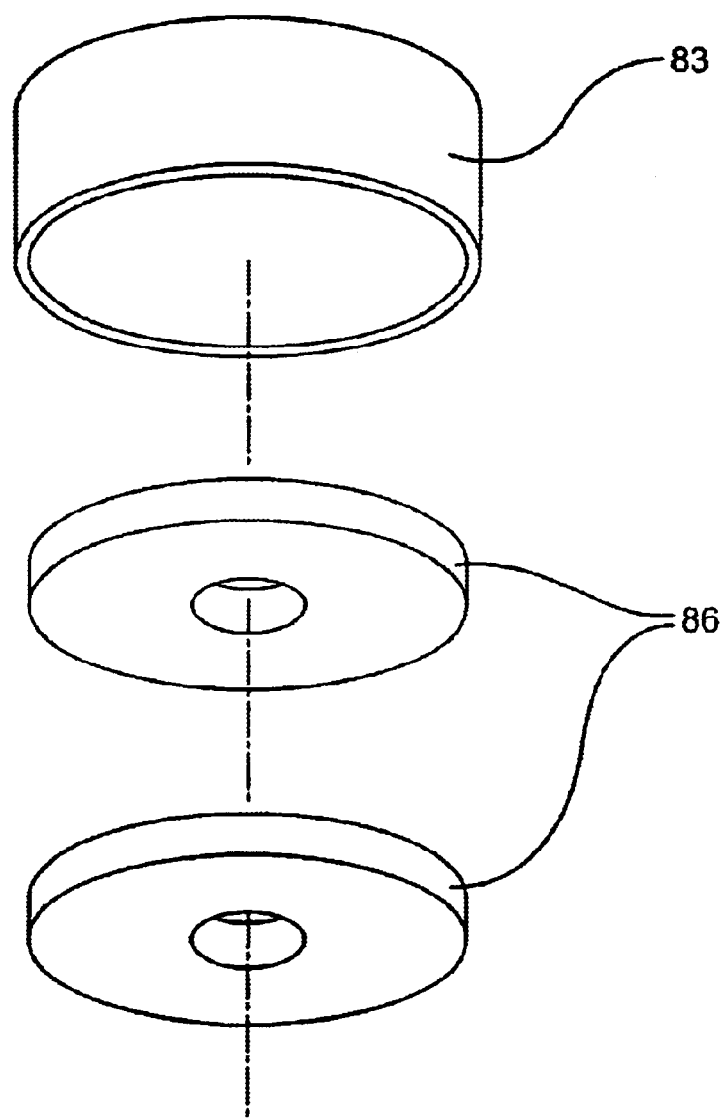
FIG. 21 is a perspective exploded view of the top cap and bearings.
Figure 22:
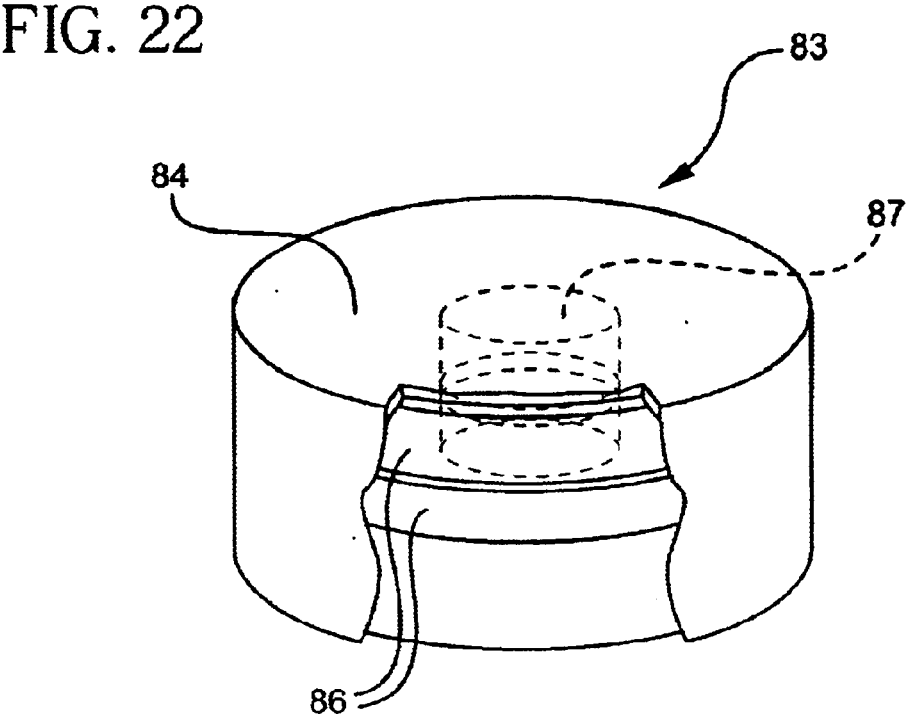
FIG. 22 is a partial cutaway view of the top cap and bearings.
Figure 23:
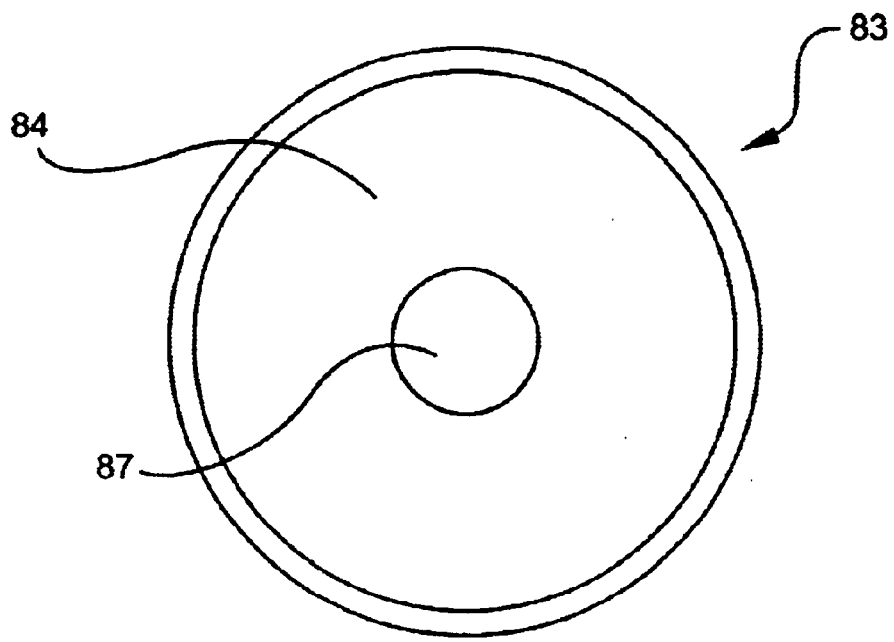
FIG. 23 is a bottom plan view of the top cap without the bearings.

The support legs 38 may require a top cap 83 that will not interfere with the rotation of the segments. The top cap 83 may be in the form of a short cylinder that fits over and rests on top of the largest or outside segment 40. There may be a flat top 84 on the top cap 83 that may by unadorned or the flat top 84 may accommodate one or more lugs 85 or other connectors. There may be two 0.25 inch (0.63 cm) plate bearings 86 inside the top cap 83 such as D-35 bearings manufactured by Union Bearings. The inside of the flat top 84 may contain a circular bearing locator 87 which may maintain the bearings 86 in the center of the top cap 83. The thickness of the bearing locator 87 may be equal to the thickness of the two plate bearings 86. The lower bearing may rest directly on the segments 40–46 and the two bearings 86 may rotate with the segments. The top cap 83 itself may not rotate so that upper rails 36 or other structures supported on the support legs 38 are not disturbed by the rotation of the segments. (See FIGS. 21, 22 and 23)

Figure 20:
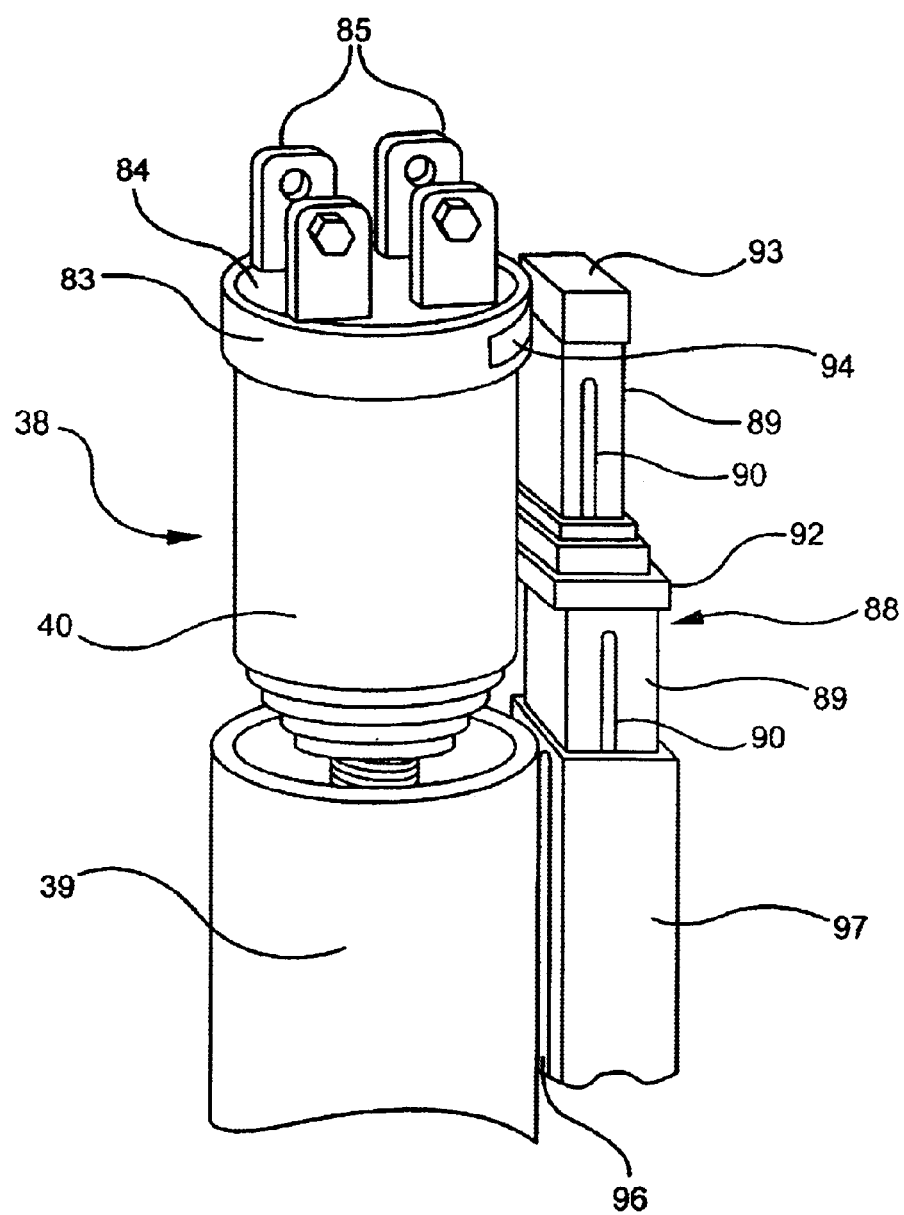
FIG. 20 is partial perspective view of the lifting assembly and brace.
Figure 25:
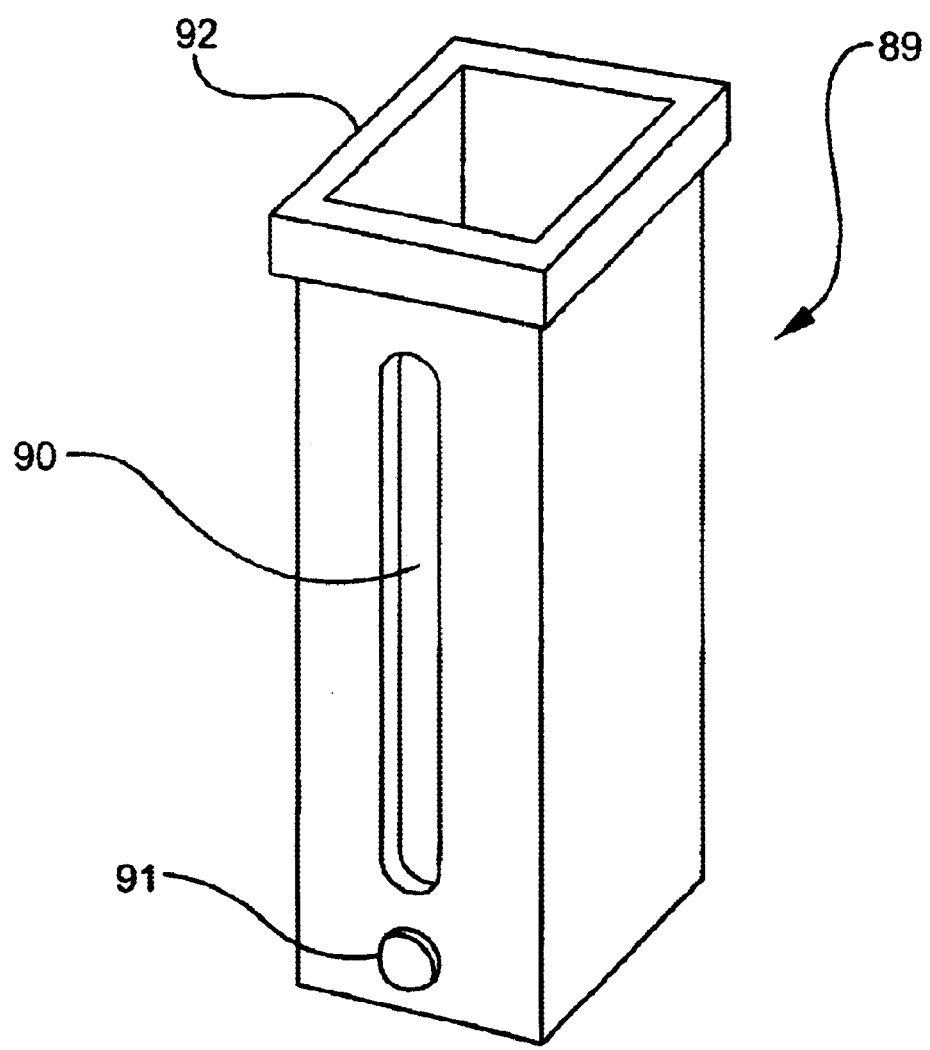
FIG. 25 is a perspective view of a segment of the brace.

The extension of the support legs 38 to a height of 65 inches (165 cm) may produce a degree of flexibility or wobble that may not be desired. To prevent any such effects in the extended legs a simple brace 88 may be set adjacent to each of the support legs 38. (FIG. 20) The braces 88 may be composed of a series of nested telescoping brace segments 89. Each brace segment 89 may be made from square metal tubing and may have a vertical slot 90 in one side, a stop knob 91 below the slot 90 and a stop collar 92 around the upper rim. (FIG. 25) The stop knob 91 of each segment may fit into the slot 90 of the larger segment below and may maintain the alignment of the segments as they are telescoped upward. The stop collars 92 may prevent the segments from falling into one another. The brace 88 may be attached to the support leg 38 at its top and at the bottom. There may be a square cap 93 attached to the uppermost and segment 89 of the brace 88 instead of a stop collar 92. A curved attaching member 94 welded or otherwise affixed to the square cap 93 and also welded to the top cap 83 of the support leg 38 provides the upper attachment and may enable the support brace 88 to be raised simultaneously with the support leg 38 providing the added stability to the extended support leg 38. There may be another curved attaching member 96 welded or otherwise affixed to the canister 39 and the lowermost brace segment 97 to provide the lower attachment.

Figure 24:
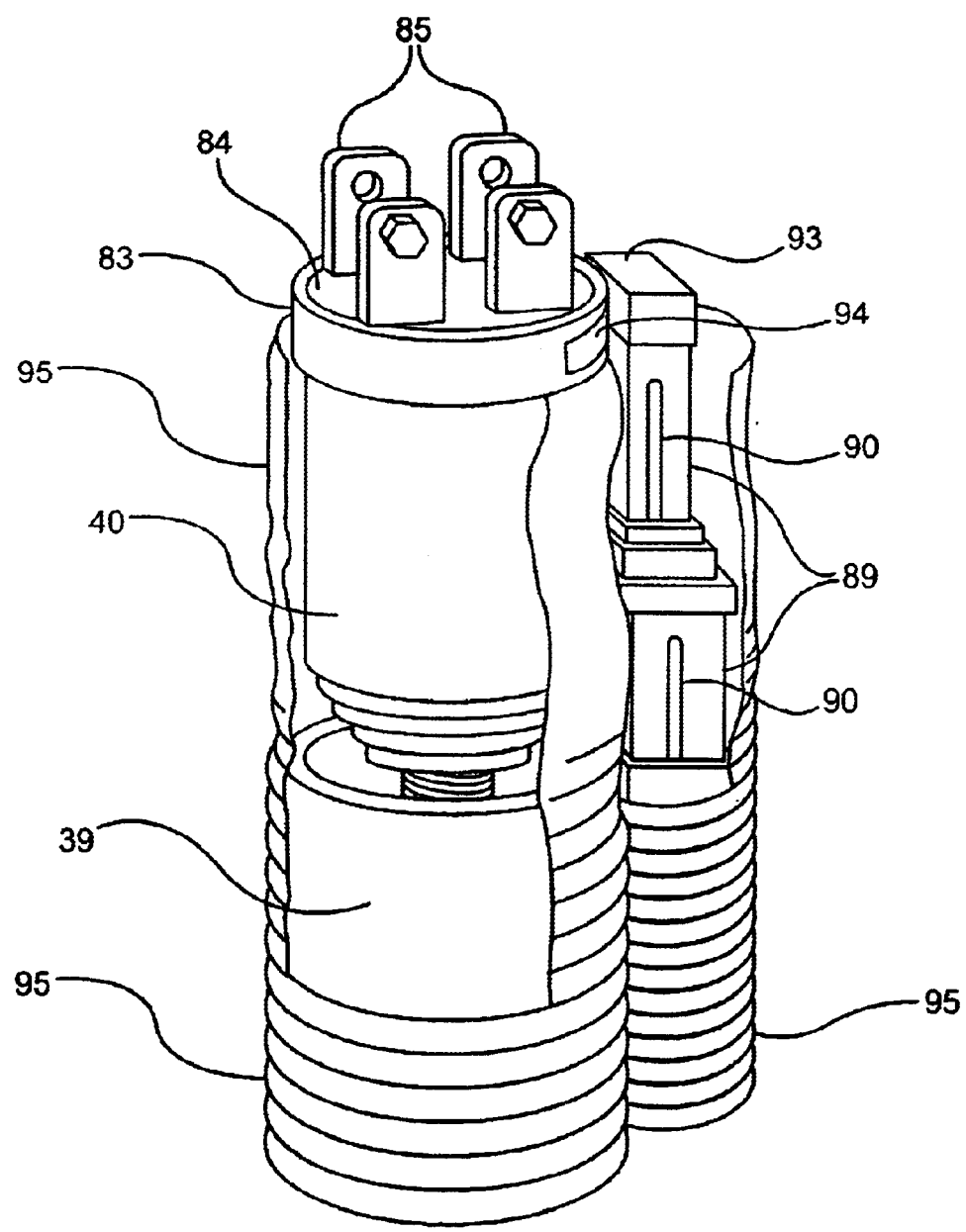
FIG. 24 is a partial cutaway view of the left assembly and brace with the sleeves.

The support legs 38 and the support braces 88 may be subject to a variety of weather conditions, road chemicals, dirt and other corrosive materials which may interfere with their smooth operation. To protect these open systems from undesirable outside conditions, protective sleeves 95 may be placed around both of them. The protective sleeves 95 may consist of telescoping rubber or other flexible polymeric sleeves that are folded accordion-style when in the compressed orientation and which easily extend upward when the support leg 38 and brace 88 are raised. The bottom of the sleeve 95 for the support leg 38 may be attached to the support frame 48 or canister 39 and the top may be attached to the top cap 83 so it may be pulled upward as the top cap 83 rises. The sleeve 95 for the support brace 88 may be attached to the lowermost segment of the brace and the brace cap 93 and may be likewise pulled upward as the brace 88 is extended. (See FIG. 24) Such sleeves are manufactured by McMaster Carr # 9421K17 (support leg 38 cover) and #9421K14 (brace 88 cover).

Figure 19:
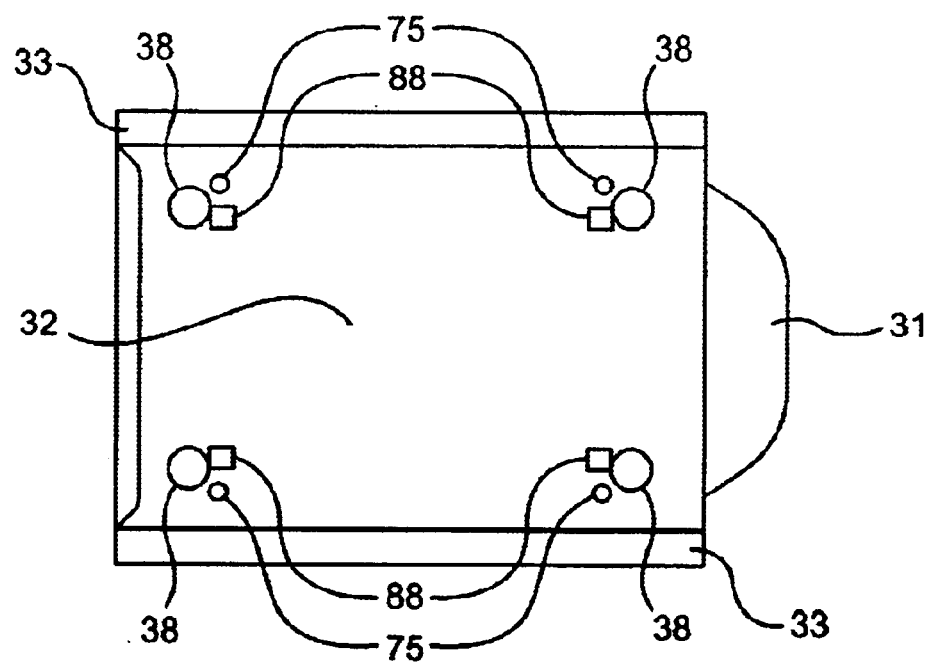
FIG. 19 is a top plan view of the bed of a pick-up truck with the lifting mechanism in place.
Figure 26:
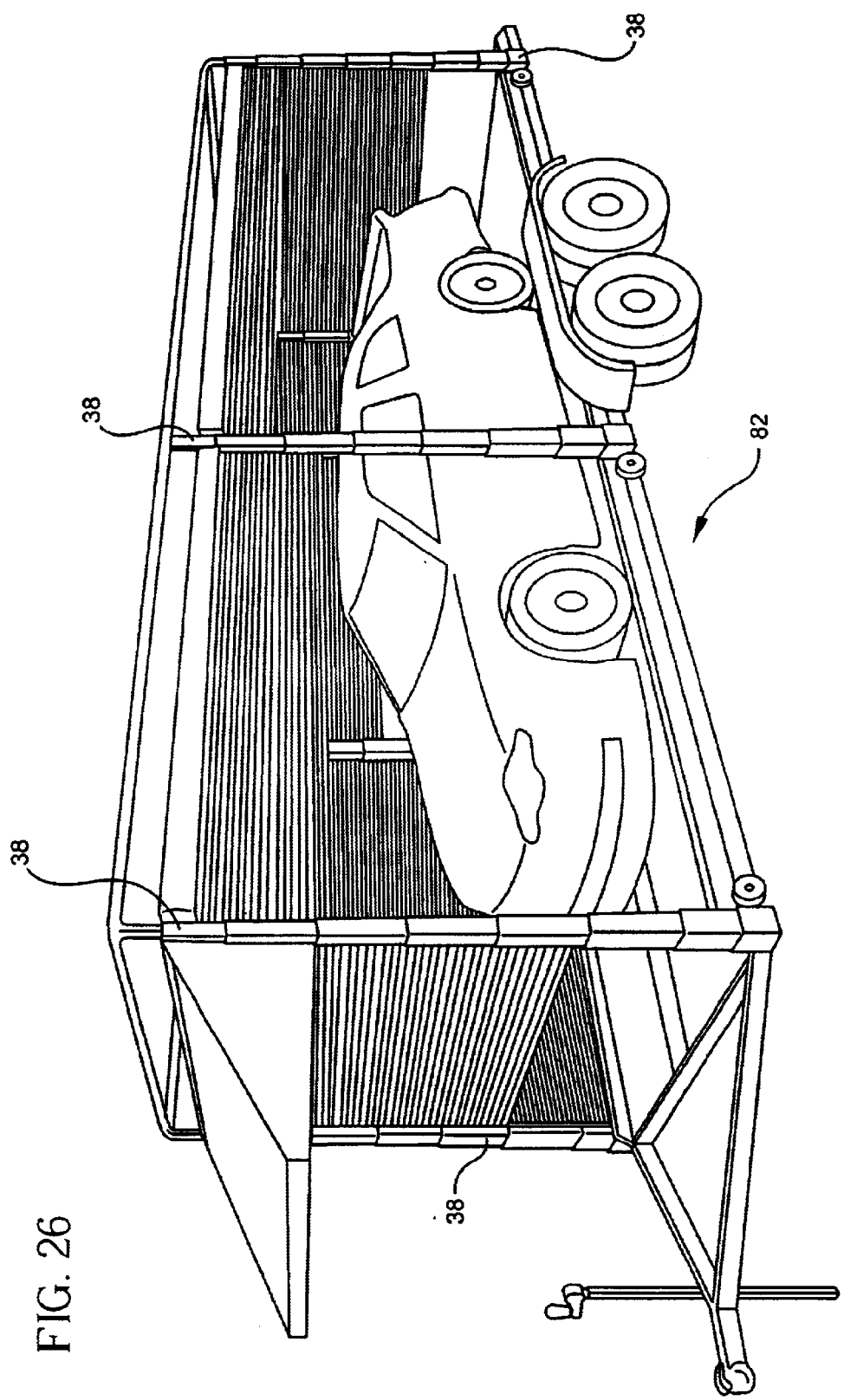
FIG. 26 is a perspective view of the lift assembly being used with a trailer.

One of the four support legs 38 of the instant invention may be placed at each of the four corners of the bed 32 of a pick-up truck as shown in FIG. 19. The best positioning of support leg 38, motor housing 75 and support brace 88 may be as illustrated. For larger pick-up trucks, flat bed trucks and trailers 82 more than four support legs 38 may be utilized. (FIG. 26)

The basic lift assembly of the instant invention may be constructed with a drive shaft, and one segment, but at least two segments are preferable and as many segments as are needed to reach the desired height and perform the desired function may be utilized. The heights and diameters of the segments may also be made to accommodate the needs of the user and are not confined to the dimensions exemplified herein.

The four unit lift assembly may be electrically wired to insure that all support legs are activated simultaneously so that the load resting on the upper rack may be raised horizontally and kept level. Other arrangements of the wiring system may permit the two front support legs to be raised with one activation and t h e rear support legs to be raised with a second activation. This system may provide a dumping function. Another arrangement may enable the two right legs to be raised together and the two left legs to be raised together providing for a slanted roof support. Other combination may also be accomplished according to the sequence in which the support legs are electrically activated.

The lift assembly of the instant invention may be used to raise and support a wide variety of rack systems as well as top caps, covers and any other units used with flat bed trucks.

The support leg unit may itself have many other applications in addition to the uses in pick-up trucks and other truck and trailer beds as described above. An individual unit may be used as a jack and has considerable lifting capacity. A single unit with a ⅝ inch (1.59 cm) drive shaft may have a one ton lifting capacity and a single unit with a ⅜ inch (0.95 cm) drive shaft may have a 500 lb lifting capacity. Units may be made to lift up to three tons. Two support legs may be used to lift heavy items such as boats. Multiple support legs may also be utilized as the supports for temporary structures or variable height enclosures.

While one embodiment of the present invention has been illustrated and described in detail, it is to be understood that this invention is not limited thereto and may be otherwise practiced within the scope of the following claims.

SLOSS PARTS LIST

| | |
|---|---|
| 30 | LIFT ASSEMBLY |
| 31 | CAB |
| 32 | TRUCK BED |
| 33 | SIDE PANELS |
| 34 | TAILGATE |
| 35 | PICK-UP TRUCK |
| 36 | UPPER RAILS |
| 37 | REAR WINDOW OF CAB |
| 38 | SUPPORT LEG |
| 39 | CANISTER |
| 40 | SEGMENT-OUTER SMOOTH |
| 41 | SEGMENT |
| 42 | SEGMENT |
| 43 | SEGMENT |
| 44 | SEGMENT |
| 45 | SEGMENT |
| 46 | SEGMENT INNER SMALLEST |
| 47 | DRIVE SHAFT |
| 48 | SUPPORT FRAME |
| 49 | FLANGE ON SUPPORT FRAME |
| 50 | OPENING IN FLANGE |
| 51 | BOLT |
| 52 | 3 THREADS |
| 53 | OUTER SURFACE THREADS |
| 54 | TOP COLLOAR |
| 55 | BOTTOM COLLAR |
| 56 | DRIVE SHAFT THREADS |
| 57 | UPPER COLLAR DRIVE SHAFT |
| 58 | LOWER CLOOAR DRIVE SHAFT |
| 59 | LOWER SMOOTH PORTION |
| 60 | KEYSEAT |
| 61 | SUPPORT BAND |
| 62 | EDGEPF SUPPORT FRAME |
| 63 | BEARING PLATE IN CANISTER |
| 64 | CENTRAL OPENING BEARING PL. |
| 65 | OPENINGS BEARING PLATE |
| 66 | MOUNTING FERRULE |
| 67 | UPPER BEARING |
| 68 | LOWER BEARING |
| 69 | BOLTS |
| 70 | NUTS |
| 71 | LARGE BROWNING PULLEY |
| 72 | CENTRAL OPENING IN PULLEY |
| 73 | CHANNEL IN PULLEY |
| 74 | MOTOR |
| 75 | MOTOR HOUSING |
| 76 | MOTOR MOUNT |
| 77 | THREADED STUDS |
| 78 | NUTS |
| 79 | SMALL BROWNING PULLEY |
| 80 | COUPLING |
| 81 | BELT |
| 82 | TRAILER |
| 83 | TOP CAP |
| 84 | TOP PLATE OF TOP CAP |
| 85 | LUGS ON TOP CAP |
| 86 | PLATE BEARINGS |
| 87 | BEARING LOCATOR |
| 88 | BRACE |
| 89 | BRACE SEGMENT |
| 90 | VERTICAL SLOT IN SEGMENT |
| 91 | STOP KNOB |
| 92 | STOP COLLAR |
| 93 | BRACE CAP |
| 94 | ATTACHING MEMBER FOR BRACE |
| 95 | PROTECTIVE SLEEVE |
| 96 | ATTACHING BOTTOM MEMBER |
| 97 | LOWERMOST SEGMENT |

I claim:

1. A rack lift assembly, for use with pick-up trucks, flat bed trucks and trailers having a horizontal cargo bed, and being capable of raising and supporting an elevated utility rack, said lift assembly comprising:

at least four telescoping support legs, each situated at a corner of the cargo bed, each of said support legs comprising;

a series of nested rotatable cylindrical segments, an outer first segment and at least one inner second segment, said first segment being smooth on its exterior surface and having at least two threads situated at the bottom of its interior surface, and said second segment being threaded on its exterior surface, having a stop means at the top of its exterior surface and a stop means at the bottom of its exterior surface, and having at least two threads situated at the bottom of its interior surface, said stop means for preventing said segments from becoming dissociated;

a canister for containment of said segments;

a support frame to support said canister on the cargo bed;

a drive shaft to rotate said segments, said drive shaft being positioned axially within the nested segments, being threaded for substantially the upper three fourths of its length, and having a stop means at its top and another stop means situated below the threads, said stop means for preventing the drive shaft from becoming dissociated from said segments;

said threads on said segments and said drive shaft being of the same dimensions for cooperation therebetween;

means to rotate the drive shaft in a forward direction and in a reverse direction; and a top cap to which the rack is affixed;

whereby when a utility rack is supported on the four support legs and the rotation means causes the drive shafts to be rotated in the forward direction the segments rotate in the forward direction and move upward such that the support legs telescope upward raising the utility rack, and when the rotation means causes the drive shaft to be rotated in the reverse direction the segments rotate in the reverse direction and are moved downward such that the support legs are collapsed and the utility rack is lowered.

2. A rack lift assembly as in claim 1 wherein stop means on the second segment and on the drive shaft are collars.

3. A rack lift assembly as in claim 2 wherein the collars are dimensioned such that their depth is the same as the depth of the threads.

4. A rack lift assembly as in claim 1 wherein the diameters of the nested segments decrease incrementally.

5. A rack lift assembly as in claim 4 wherein as the diameters of the nested segments decrease incrementally the lengths of the nested segments increase incrementally.

6. A rack lift assembly as in claim 1 wherein the canister is cylindrical.

7. A rack lift assembly as in claim 1 wherein the canister further comprises a horizontal bearing plate affixed near its lower interior edge, said bearing plate having a central aperture through which the drive shaft passes.

8. A rack lift assembly as in claim 7 further comprising a bearing situated above the bearing plate and being adjacent thereto.

9. A rack lift assembly as in claim 7 further comprising a bearing situated below the bearing plate and being adjacent thereto.

10. A rack lift assembly as in claim 1 further comprising means to reversibly affix said support frame to the cargo bed.

11. A rack lift assembly as in claim 1 wherein the means to rotate the drive shaft comprises:
- a key seat disposed on the lower portion of the drive shaft,
- a motor capable of operating in a forward and in a reverse direction,
- a first pulley rotated by said motor,
- a belt rotated by said first pulley,
- a second pulley rotated by said belt, said second pulley being in communication with the drive shaft and having an aperture dimensioned to accept the key seat.

12. A rack lift assembly as in claim 11 wherein the first pulley and the second pulley are Browning pulleys.

13. A rack lift assembly as in claim 12 wherein the belt is a Browning belt.

14. A rack lift assembly as in claim 11 further comprising a housing to contain said motor.

15. A rack lift assembly as in claim 11 further comprising a motor mount to support said motor.

16. A rack lift assembly as in claim 15 further comprising means to adjustably affix said motor mount to the support frame.

17. A rack lift assembly as in claim 1 wherein the threads situated on the first segment, the second segment and the drive shaft are all Acme 5 threads.

18. A rack lift assembly as in claim 1 wherein the top cap is cylindrical.

19. A rack lift assembly as in claim 18 wherein the top cap further comprises a flat top member, at least one plate bearing situated under the flat top member, and a bearing locator centrally affixed to the underside of the flat top member, whereby the bearing is rotatable with the segments and the top cap does not rotate with the segments.

20. A rack lift assembly as in claim 19 wherein the flat top member further comprises at least one attaching member for securing the utility rack to the support leg.

21. A rack lift assembly as in claim 1 further comprising protective sleeves which are capable of completely enclosing each support leg and protecting the support legs from undesirable outside conditions.

22. A rack lift assembly as in claim 21 wherein the protective sleeves are composed of flexible material such that they can expand as the support legs are telescoped upward and can contract as the support legs are collapsed.

23. A rack lift assembly as in claim 1 further comprising telescoping brace means affixed to the top cap and canister of each support leg for providing bracing and stability to the support legs when fully extended.

24. A rack lift assembly as in claim 23 wherein the brace means comprises a series of nested segments and a base segment dimensioned to contain the nested segments.

25. A rack lift assembly as in claim 24 wherein each of the nested segments further comprises stop means to prevent the segments from becoming dissociated.

26. A rack lift assembly as in claim 25 wherein the stop means comprises a vertical slot and a stop knob.

27. A rack lift assembly as in claim 24 wherein the nested segments are square in cross section.

28. A rack lift assembly as in claim 23 further comprising protective sleeves which are capable of completely enclosing each brace means and protecting the brace means from undesirable outside conditions.

29. A rack lift assembly as in claim 28 wherein the protective sleeves are composed of flexible material such that they can expand as the brace means are telescoped upward and can contract as the brace means are collapsed.

30. A lift assembly for smoothly raising and lowering a load, said lift assembly comprising:
- a series of nested rotatable cylindrical segments, an outer first segment being smooth on its exterior surface and having at least two threads situated at the bottom of its interior surface, at least one inner second segment being threaded on its exterior surface, having a collar about the top of its exterior surface and a collar about the bottom of its exterior surface and having at least two threads situated at the bottom of its interior surface;
- a canister for containment of said segments;
- a support frame to support said canister on a horizontal surface;
- a drive shaft to rotate said segments, said drive shaft being positioned axially within the nested segments, being threaded for substantially the upper three fourths of its length, and having a first collar about its top and a second collar situated below the threads;
- said threads on said segments and said drive shaft being of the same dimensions for cooperation therebetween, and said collars on said segments and said drive shaft being capable of acting as stops to prevent said segments from becoming dissociated;
- rotation means to rotate the drive shaft in a forward direction and in a reverse direction; and
- a cylindrical top cap on which the load is supported;

whereby when the load is supported on said lift assembly and the rotation means causes the drive shaft to be rotated in the forward direction the segments rotate in the forward direction and move upward such that the lift assembly telescopes upward raising the load, and when the rotation means causes the drive shaft to be rotated in the reverse direction the segments rotate in the reverse direction and are moved downward such that the lift assembly is collapsed and the load is lowered.

31. A lift assembly as in claim 30 wherein the top cap comprises a flat top member, at least one plate bearing situated under the flat top member, and a bearing locator centrally affixed to the underside of the flat top member, whereby the bearing is rotatable with the segments and the top cap does not rotate with the segments.

* * * * *